US008659620B2

(12) United States Patent
McMullen et al.

(10) Patent No.: US 8,659,620 B2
(45) Date of Patent: Feb. 25, 2014

(54) METHODS AND APPARATUS FOR RENDERING IMAGES

(75) Inventors: Roderick A. McMullen, Tampa, FL (US); David Hilsabeck, Valrico, FL (US)

(73) Assignee: Accusoft Corporation, Tampa, FL (US)

( * ) Notice: Subject to any disclaimer, the term of this patent is extended or adjusted under 35 U.S.C. 154(b) by 968 days.

(21) Appl. No.: 12/422,574

(22) Filed: Apr. 13, 2009

(65) Prior Publication Data

US 2010/0259557 A1   Oct. 14, 2010

(51) Int. Cl.
*G09G 5/00* (2006.01)
(52) U.S. Cl.
USPC ............. 345/619; 345/644; 345/645; 358/1.9
(58) Field of Classification Search
USPC ......................................................... 345/619
See application file for complete search history.

(56) References Cited

U.S. PATENT DOCUMENTS

| | | | | |
|---|---|---|---|---|
| 3,976,982 A * | 8/1976 | Eiselen | ......................... | 382/284 |
| 4,947,344 A * | 8/1990 | Hayashi et al. | ................ | 345/658 |
| 4,956,801 A * | 9/1990 | Priem et al. | ..................... | 708/514 |
| 5,204,916 A * | 4/1993 | Hamilton et al. | ............. | 382/296 |
| 5,598,181 A * | 1/1997 | Kermisch | ....................... | 345/658 |
| 5,883,973 A * | 3/1999 | Pascovici et al. | ............. | 382/176 |
| 6,330,374 B1 * | 12/2001 | Yamaguchi et al. | .......... | 382/297 |
| 6,740,098 B2 * | 5/2004 | Abrams et al. | ................ | 606/148 |
| 6,757,447 B2 * | 6/2004 | Yamaguchi et al. | .......... | 382/293 |
| 6,956,667 B2 * | 10/2005 | Delhoune et al. | ............ | 358/1.18 |
| 7,120,317 B1 * | 10/2006 | Wu et al. | ........................ | 382/296 |
| 7,164,489 B2 * | 1/2007 | Li et al. | .......................... | 358/1.16 |
| 7,343,046 B2 * | 3/2008 | Curry et al. | .................... | 382/243 |
| 7,411,630 B2 * | 8/2008 | Kim et al. | ...................... | 348/716 |
| 7,701,472 B2 * | 4/2010 | Obinata | ......................... | 345/649 |
| 7,742,063 B2 * | 6/2010 | Leung et al. | ................... | 345/649 |
| 8,086,037 B2 * | 12/2011 | Yang | .............................. | 382/173 |
| 2003/0107766 A1 * | 6/2003 | Ramot et al. | ................. | 358/1.18 |
| 2005/0180642 A1 * | 8/2005 | Curry et al. | .................... | 382/232 |
| 2005/0180647 A1 * | 8/2005 | Curry et al. | .................... | 382/243 |
| 2006/0274070 A1 * | 12/2006 | Herman et al. | ................ | 345/474 |
| 2008/0034292 A1 * | 2/2008 | Brunner et al. | ............... | 715/700 |
| 2009/0096813 A1 * | 4/2009 | Nagaraj et al. | ................ | 345/649 |

\* cited by examiner

*Primary Examiner* — M Good Johnson
(74) *Attorney, Agent, or Firm* — Straub & Pokotylo; Michael P. Straub; Stephen T. Straub

(57) ABSTRACT

To facilitate rendering an image, e.g., a portion of a PDF page, at higher resolutions or locations than could be expressed using standard 32 bit fixed point integer values, an image is segmented and a user space coordinate system origin used for individual segment processing is transformed on a per segment basis to each segment locality before a render request is made to a rendering function library. After a new origin of a segment is established, the PDF page content contained within that locality corresponding to the individual segment being processed is rendered, e.g., using functions available in the PDF software library. The results of processing the segments is combined to produce a final high-resolution image. While the input to the rendering process may include values which can not be expressed in 32 bit fixed point notation, the segmentation process allows the individual segments to be rendered using rendering specified using such notation.

14 Claims, 23 Drawing Sheets

METHODS AND APPARATUS FOR RENDERING IMAGES

FIELD OF INVENTION

The present invention relates to the field of image processing and, more particularly, to methods and apparatus for image rendering, e.g., rendering of high-resolution PDF page content.

BACKGROUND OF INVENTION

The Adobe Portable Document Format (PDF) is a file format that represents documents in a manner independent of the creator application and the device used to view or print. One PDF version currently in use is Adobe PDF v 1.7. A PDF document, e.g., in the form of a data file, contains one or more pages that can express static compositions of text, graphics and images, as well as interactive objects such as form fields and annotations. PDF defines several coordinate spaces in which the coordinates specifying text, graphics and image objects are interpreted, including device space and user space. PDF page content is viewed or printed on a raster output device with a built-in coordinate system called device space. To avoid device-dependent effects of specifying coordinates with respect to a single device space, PDF defines a device-independent coordinate system called user space. The user space origin, orientation, and unit size are established for each page of the PDF document from the page's crop box rectangle, intrinsic rotation and resolution. PDF user space is transformed to device space for viewing and printing using a transformation matrix that specifies a linear mapping of two-dimensional coordinates including translation, rotation, reflection, scaling and skewing.

A coordinate P that is expressed with an ordered pair of real numbers (x, y) can also be expressed as the row matrix [x y 1]. The row matrix form facilitates its transformation using a 3-by-3 affine transformation matrix M resulting in a new coordinate P'.

$$M = \begin{bmatrix} a & b & 0 \\ c & d & 0 \\ e & f & 1 \end{bmatrix}$$

$$P = [x \ y \ 1]$$

$$P' = [x' \ y' \ 1]$$

$$P' = PM$$

$$P' = [x \ y \ 1] \begin{bmatrix} a & b & 0 \\ c & d & 0 \\ e & f & 1 \end{bmatrix}$$

$$x' = a \times x + c \times y + e$$

$$y' = b \times c + d \times y + f$$

PDF rectangles are specified using the coordinates for a pair of diagonally opposite corners. PDF rectangle sides are constrained to be perpendicular to the user space coordinate system axes. Consider for example the rectangle 1500 and corresponding render area $R_A$ shown in FIG. 15. The rectangle R defining the area $R_A$ can also be expressed with an array of offsets {left, bottom, right, top} that can be used to specify corner coordinates of the rectangle.

$R_{bl}$=[left bottom 1]

$R_{br}$=[right bottom 1]

$R_{tl}$=[left top 1]

$R_{tr}$=[right top 1]

PDF rectangles are transformed differently than PDF coordinates. A PDF rectangle R transformed with 3-by-3 affine transformation matrix M is expected to produce the smallest rectangle R' that contains all corner coordinates of R transformed with M. This operation is represented with the function g(R, M) where R is a PDF rectangle and M is a 3-by-3 affine transformation matrix.

$$R' = g(R,M)$$

Consider an image processing software function library, such as the existing Adobe PDF Library (PDFL), which is a library of functions that is included in the Adobe® PDF Library software development kit (SDK) version 8.1 (PDFL SDK 8.1). Currently the PDFL functions accept, e.g., have an interface for receiving, at least two input parameters to customize how PDF graphics are rendered by one or more of the PDFL functions. The two input are (1) a Render Area $R_A$ and (2) a Render Matrix $M_{RM}$. The Render Area $R_A$ is a PDF rectangle, expressed in user space units, that confines rendering to visible graphics within its boundaries. The Render Matrix $M_{RM}$ is a 3-by-3 affine transformation matrix, expressed in user space units, that transforms the user space coordinate system into a device coordinate system for drawing and/or other manipulation operations. A successful render operation quantizes transformed page graphics contained within the two-dimensional rectangular area as a two-dimensional raster image. See for example FIG. 16 which shows rectangle 1600 which corresponds to rectangle 1500 of FIG. 15 after an exemplary rendering to device space. The raster image is segmented into rows of pixel data using its stride, which represents the number of bytes required to encode one row of pixel data. Finally the two-dimensional raster image is streamed into a one-dimensional vector of pixel data bytes as output.

The PDFL requires that inputs to the PDFL functions specify the Render Area and Render Matrix data structures using real numbers represented with 32-bit, fixed point integer values. Unfortunately, limiting the inputs to the use of fixed point integer values limits transformations that can be expressed, as well as the locality of transformed graphics that may be rendered by the PDFL. This is because a 32-bit, fixed point integer is used to represent a rational number, where the most-significant 16 bits are used for the signed, integer part and the least significant 16 bits are used for the unsigned, fractional part. Such a representation restricts legal values to the set X where:

$$X = \{x : x \in \mathbb{Q}, x = m + f \times 2^{-16}, m \in \mathbb{Z}, f \in \mathbb{Z}, |m| < 2^{15}, |f| < 2^{16}\}$$

For the smallest x∈X $$x = m + f \times 2^{-16}$$

$$x = (-2^{15} + 1) + (-2^{16} + 1) \times 2^{-16}$$

$$x = (-32768 + 1) + \frac{-65536 + 1}{65536}$$

-continued $$x = -32767 - \frac{65535}{65536}$$

$$x \approx -32767.99998$$

For the largest $x \in X$ $$x = m + f \times 2^{-16}$$

$$x = (2^{15} - 1) + (2^{16} - 1) \times 2^{-16}$$

$$x = (32768 - 1) + \frac{65536 - 1}{65536}$$

$$x = 32767 + \frac{65535}{65536}$$

$$x \approx -32767.99998$$

A number $r \in \mathbb{R}$ is approximated with x if $\exists x: x \in X$, $|r-x| < 2^{-16}$. The set of Real numbers that can be approximated with X is denoted as set Y.

$$Y = \{r : r \in \mathbb{R}, |r| < 32768\}$$

As a result of the use of 32 bit fixed point integer values by the PDFL, the Render Area and Render Matrix data structures are subject to the domain restriction of Y when the PDFL functions are used.

$$R_A = \{x_0, y_0, x_1, y_1\}, \text{ where } \{x_0, y_0, x_1, y_1\} \in Y$$

$$M_{RM} = \begin{bmatrix} a & b & 0 \\ c & d & 0 \\ e & f & 1 \end{bmatrix}, \text{ where } \{a, b, c, d, e, f\} \in Y$$

Unfortunately, the 32 bit fixed point constraint limits the usefulness of the available PDF functions particularly in the case where large images are to be processed. The following example demonstrates a specific render request that cannot be directly fulfilled using the PDFL due to the input constraints. Consider a raster display device with a two-dimensional rectangular display area of 1280×1024 pixels whose origin (0,0) is the top-left coordinate and whose unit size is 96 DPI. In this example the PDFL is directed to render the top-right 2"×2" area of a 127"×90" PDF page at six times (×6) device magnification. Assume for this example that the PDF page crop box rectangle $R_{crop}$ is located at the user space origin, sized identical to the dimensions of the PDF page, the intrinsic page rotation δ is zero degrees clockwise, and the resolution of user space is 72 DPI.

$$R_{crop} = \{x_0, y_0, x_1, y_1\}$$

$$R_{crop} = \{0, 0, 127 \times 72 \text{DPI}, 90 \times 72 \text{DPI}\}$$

$$R_{crop} = \{0, 0, 9144, 6480\}$$

$$\delta = 0°$$

A Render Area $R_A$ corresponding to a 2"×2" area at the top-right corner of a 127"×90" PDF page will be calculated. See, for example the rectangle 1900 shown in FIG. 19 which shows the render area corresponding to a 2"×2" area at the top-right corner of a 127"×90" PDF page in user space.

$$R_{crop} = \{0, 0, 9144, 6480\}$$

$$R_A = \{9144 - \Delta x, 6480 - \Delta y, 9144, 6480\}$$

$$\Delta x = \Delta y = 2" \times 72 \text{DPI} = 144$$

$$R_A = \{9000, 6336, 9144, 6480\}$$

To transform user space to device space for rendering, a Render Matrix $M_{RM}$ is used that (1) flips user space coordinate across the x-axis, such that the top-left corner of the page becomes the coordinate system origin (See FIG. 20 illustrating rectangle 2000), (2) translates the bottom-left corner of the flipped Render Area $R_A$ to the coordinate system origin, and (3) scales user space unit size from 72 DPI to 384 DPI. For this example, the Render Matrix can be expressed as the product of the Default Page Matrix, a Flip Matrix, a Translate Matrix and a Scale Matrix.

$$M_{RM} = M_{DPM} M_F M_T M_S$$

A Default Page Matrix $M_{DPM}$ transforms the user space coordinate system to the rotated, cropped page space coordinate system. For a page with the crop box rectangle $R_{crop}$ located at the user space origin and an intrinsic page rotation δ equal to zero degrees clockwise, Default Page Matrix $M_{DPM}$ is the 3-by-3 identity matrix.

$$M_{DPM} = \begin{bmatrix} 1 & 0 & 0 \\ 0 & 1 & 0 \\ 0 & 0 & 1 \end{bmatrix}$$

The Flip Matrix $M_F$ transforms the bottom-to-top page coordinate system to the top-to-bottom device coordinate system, as identified from the PDF page crop box rectangle $R_{crop}$. The rectangle $R_{crop}$ can be expressed as a 4-by-3 matrix of corner coordinates.

$$R_{crop} = \{0, 0, 9144, 6480\}$$

$$R_{crop} \equiv \begin{bmatrix} x_0 & y_0 & 1 \\ x_0 & y_1 & 1 \\ x_1 & y_0 & 1 \\ x_1 & y_1 & 1 \end{bmatrix} \equiv \begin{bmatrix} 0 & 0 & 1 \\ 0 & 6480 & 1 \\ 9144 & 0 & 1 \\ 9144 & 6480 & 1 \end{bmatrix}$$

The PDFL function g(R, M) may be used to transform rectangle $R_{crop}$ with the Default Page Matrix $M_{PDM}$ to obtain the crop box rectangle $R_{crop,DPM}$ expressed in page space units.

$$R_{crop} = \{0, 0, 9144, 6480\}$$

$$R_{crop,DPM} = g(R_{crop}, M_{DPM})$$

$$R_{crop,DPM} \equiv \begin{bmatrix} 0 & 0 & 1 \\ 0 & 6480 & 1 \\ 9144 & 0 & 1 \\ 9144 & 6480 & 1 \end{bmatrix} M_{DPM}$$

$$R_{crop,DPM} \equiv \begin{bmatrix} 0 & 0 & 1 \\ 0 & 6480 & 1 \\ 9144 & 0 & 1 \\ 9144 & 6480 & 1 \end{bmatrix} \begin{bmatrix} 1 & 0 & 0 \\ 0 & 1 & 0 \\ 0 & 0 & 1 \end{bmatrix}$$

$$R_{crop,DPM} \equiv \begin{bmatrix} 0 & 0 & 1 \\ 0 & 6480 & 1 \\ 9144 & 0 & 1 \\ 9144 & 6480 & 1 \end{bmatrix}$$

$$R_{crop,DPM} = \{0, 0, 9144, 6480\}$$

The Flip Matrix reflects and translates the page coordinate system across the x-axis using the top offset of the crop box rectangle, expressed in page space units.

$$M_F = \begin{bmatrix} 1 & 0 & 0 \\ 0 & -1 & 0 \\ 0 & h & 1 \end{bmatrix}$$

$$h = 6480.0$$

A Translate Matrix $M_T$ is used to transform the flipped, page coordinate system to the locality coordinate system, such that the bottom-left corner of the Render Area $R_A$ is the new origin. Since the Render Area $R_A$ was originally expressed for a non-flipped PDF page area, it must be transformed using the Flip Matrix $M_F$ to logically cover the same 2"×2" corner of the PDF page. The rectangle $R_A$ can be expressed as a 4-by-3 matrix of corner coordinates.

$$R_A = \{9000, 6336, 9144, 6480\}$$

$$R_A \equiv \begin{bmatrix} x_0 & y_0 & 1 \\ x_0 & y_1 & 1 \\ x_1 & y_0 & 1 \\ x_1 & y_1 & 1 \end{bmatrix} \equiv \begin{bmatrix} 9000 & 6336 & 1 \\ 9000 & 6480 & 1 \\ 9144 & 6336 & 1 \\ 9144 & 6480 & 1 \end{bmatrix}$$

The PDFL function g(R, M) is used to transform rectangle $R_A$ with the Flip Matrix $M_F$ to obtain the flipped Render Area $R_{A,F}$. See, for example, rectangle 20000 of FIG. 20.

$$R_{A,F} = g(R_A, M_F)$$

$$R_{A,F} \equiv \begin{bmatrix} 9000 & 6336 & 1 \\ 9000 & 6480 & 1 \\ 9144 & 6336 & 1 \\ 9144 & 6480 & 1 \end{bmatrix} M_F$$

$$R_{A,F} \equiv \begin{bmatrix} 9000 & 6336 & 1 \\ 9000 & 6480 & 1 \\ 9144 & 6336 & 1 \\ 9144 & 6480 & 1 \end{bmatrix} \begin{bmatrix} 1 & 0 & 0 \\ 0 & -1 & 0 \\ 0 & 6480 & 1 \end{bmatrix}$$

$$R_{A,F} \equiv \begin{bmatrix} 9000 & 144 & 1 \\ 9000 & 0 & 1 \\ 9144 & 144 & 1 \\ 9144 & 0 & 1 \end{bmatrix}$$

$$R_{A,F} = \{9000, 0, 9144, 144\}$$

Relative to the flipped Render Area, $R_{A,F}$, the Translate Matrix is calculated as:

$$M_T = \begin{bmatrix} 1 & 0 & 0 \\ 0 & 1 & 0 \\ t_x & t_y & 1 \end{bmatrix}$$

$$t_x = -9000$$

$$t_y = 0$$

The Scale Matrix $M_S$ transforms the locality coordinate system unit size to the device coordinate system unit size such that user space resolution, typically 72 DPI, is magnified to the device resolution of 384 DPI.

$$M_s = \begin{bmatrix} s_x & 0 & 0 \\ 0 & s_y & 0 \\ 0 & 0 & 1 \end{bmatrix}$$

$$s_x = s_y = \frac{96\ DPI \times 6}{72\ DPI} = \frac{384}{72} \approx 5.33$$

The effective Render Matrix $M_{RM}$ that transforms the user space coordinate system to the specified device coordinate system is calculated as:

$$M_{RM} = M_{DPM} M_F M_T M_S$$

$$M_{RM} = \begin{bmatrix} 1 & 0 & 0 \\ 0 & 1 & 0 \\ 0 & 0 & 1 \end{bmatrix} \begin{bmatrix} 1 & 0 & 0 \\ 0 & -1 & 0 \\ 0 & h & 1 \end{bmatrix} \begin{bmatrix} 1 & 0 & 0 \\ 0 & 1 & 0 \\ t_x & t_y & 1 \end{bmatrix} \begin{bmatrix} s_x & 0 & 0 \\ 0 & s_y & 0 \\ 0 & 0 & 1 \end{bmatrix}$$

$$M_{RM} = \begin{bmatrix} 1 & 0 & 0 \\ 0 & 1 & 0 \\ 0 & 0 & 1 \end{bmatrix} \begin{bmatrix} 1 & 0 & 0 \\ 0 & -1 & 0 \\ 0 & 6480 & 1 \end{bmatrix} \begin{bmatrix} 1 & 0 & 0 \\ 0 & 1 & 0 \\ -9000 & 0 & 1 \end{bmatrix} \begin{bmatrix} 5.33 & 0 & 0 \\ 0 & 5.33 & 0 \\ 0 & 0 & 1 \end{bmatrix}$$

$$M_{RM} = \begin{bmatrix} 5.33 & 0 & 0 \\ 0 & -5.33 & 0 \\ -47970 & 34538.4 & 1 \end{bmatrix}$$

The PDFL function g(R, M) is then used to transform rectangle $R_A$ with the Render Matrix $M_{RM}$ so that the requested area logically covers the same 2"×2" locality on the rendered PDF page. See for example FIG. 22 which shows the render area corresponding to a 2"×2" area at the top right corner of a 127"×90" PDF page in flipped, translated, scaled page space or device space.

$$R_{A,RM} = g(R_A, M_{RM})$$

$$R_{A,RM} \equiv \begin{bmatrix} 9000 & 6336 & 1 \\ 9000 & 6480 & 1 \\ 9144 & 6336 & 1 \\ 9144 & 6480 & 1 \end{bmatrix} \begin{bmatrix} 5.33 & 0 & 0 \\ 0 & -5.33 & 0 \\ -47970 & 34538.4 & 1 \end{bmatrix}$$

$$R_{A,RM} \equiv \begin{bmatrix} 0 & 767.52 & 1 \\ 0 & 0 & 1 \\ 767.52 & 767.52 & 1 \\ 767.52 & 0 & 1 \end{bmatrix}$$

-continued $$R_{A,RM} = \{0, 0, 767.52, 767.52\}$$

To directly render PDF page graphics inside the top-right, 2"×2" locality of a 127"×90" PDF page at six times (×6) device resolution, the Render Matrix $M_{RM}$ and Render Area $R_{A,RM}$ must be successfully expressed using the syntax required for the interface to the PDFL functions.

$$M_{RM} = \begin{bmatrix} 5.33 & 0 & 0 \\ 0 & -5.33 & 0 \\ -47970 & 34538.4 & 1 \end{bmatrix}$$

$$R_{A,RM} = \{0, 0, 767.52, 767.52\}$$

However, the Render Matrix $M_{RM}$ cannot be directly represented using the PDFL interface. The numbers −47970 and −32538.4 cannot be reasonably approximated with X since these values are not contained in the set Y.

$$Y = \{r: r \in \mathbb{R}, |r| < 32768\}$$

$$Y \not\supset \{-47970, 34538.4\}$$

From the above, it should be appreciated that existing image processing library functions which use 32 bit fixed point values can result in undesirable limitations on the size and/or resolutions of images which are to be processed. While rewriting library functions, e.g., PDFL functions, to use values other than 32 bit fixed point integer values would be one approach to overcome the limitations discussed above, such an approach would be costly and result in much or all of the existing library functions being discarded.

In view of the above discussions, it should be appreciated that there is a need for methods and apparatus which can be used to render or otherwise process relatively large images and or high resolution images, e.g., images having area or other ranges which require the use of values larger than those which can be expressed using 32 bit fixed integer values. It would be desirable if at least some of the methods and/or apparatus could use or otherwise take advantage of one or more existing library functions and/or hardware which use 32 bit fixed integer values to specify various input and/or output values.

SUMMARY OF INVENTION

Methods and apparatus which are well suited for processing and/or otherwise performing transformations on image data to produce an output set of data, e.g., a set of rendered image data, are described. The rendered image data, e.g., a bitmap file of an image resulting from one or more transformations performed as part of the rendering process, may be stored and/or displayed. In the case of a stored image it may be retrieved and transmitted at a later time. The rendered and displayed or transmitted image may represent trees, people, charts, graphics, text, or other images that have real world meaning.

In accordance with the invention large images may be processed with transformations and/or other manipulations being performed on the input images, e.g., input PDF data representing an image, to generate an output image. While various transforms and/or rendering matrices may be specified, in accordance with the present invention using 32 bit floating point values. As part of the processing, calls to functions and/or hardware which use 32 bit fixed integer values are made. By allowing for the use of 32 bit floating point values, large images, with location and/or transform values greater than that which can be specified by the 32 bit fixed integer values alone, can be processed. By supporting calls to functions and/or hardware which use 32 bit fixed point integer values, one or more known function libraries or hardware can be used providing a cost efficient approach to implementing an image processing system.

While converting between floating point and fixed point values might seem a simple way of taking advantage of the functions and/or hardware which uses 32 bit integer values, this alone is insufficient since the range of the 32 bit floating point values can vastly exceed the possible size range of 32 bit fixed point values.

In accordance with the present invention, to make use of functions requiring the use of 32 bit fixed point integer values, a portion of an input image upon which a rendering operation, e.g., an image processing operation including a transformation is to be performed, is subjected to a partitioning operation, the size of each image segment, also sometimes referred to as a tile. The individual segments are processed and transformed separately with the result of rendering an individual segment being stored and combined with the results of rendering other segments, e.g., in an output buffer, used to store the data corresponding to the output image.

While the location of a segment in the input image may be far from the origin, for rendering purposes the segment is shifted so that the values, when expressed in 32 bit fixed point form, will be smaller than if the segment were located away from the origin. The transformation to be performed on a segment is expressed, in some embodiments, in 32 bit fixed point integer values. The segment with the area to be rendered having been shifted so that a corner is positioned at the origin of the space used for rendering images is passed to a function which performs the actual transformation and rendering of the segment. The routines used to render individual segments, in one particular PDF embodiment, include standard functions in a PDFL. Once a segment is rendered, the resulting segment data is stored, using some of the original partition information which indicates the source location of the segment being processed in the original image, in a portion of an output buffer used to store the image file produced by the rendering process.

Thus, through the use of segmentation, shifting of the segments to the origin for rendering purposes, and then positioning of the rendered image segment data in the proper location in the output image file, large images and/or transformation can be performed using functions and/or hardware which uses 32 bit fixed point integer representation to represent position and/or other values.

The segmentation, location shifting and segment rendering approach may involve the processing of multiple segments and thus numerous iterations of the segment processing functions particularly in the case of large images. While computers have increased in terms of processing speed considerably in recent years, image processing can still involve a noticeable amount of time.

While fixed size segments may be used, e.g., with relatively small segments being used for a wide range of images, this can be inefficient in terms of the number of segments an image is divided into for processing purposes. In accordance with one feature of the invention, in some but not necessarily all embodiments, prior to image segmentation the size of the image segments is dynamically determined, e.g., in a process intended to minimize or reduce the total number of segments which will be created and processed. In this manner by optimizing segment size to values which can be expressed and transformed using 32 bit fixed point integer values, the number of calls or segment level processing iterations can be minimized due to the minimization of the total number of segments to be processed. In one particular segment size determination approach, a segment width is first determined. The vertical height of the segments are then determined with the image being partitioned accordingly following the dynamic determination of segment size. In such an approach, as different images and/or areas of images are processed, the segment size may be varied in order to minimize the number of segments which need to be processed while using values which can be readily expressed using 32 bit fixed point integer values.

In some particular embodiments the method involves directing functions of a PDFL, e.g., the standard PDFL, to render and transform PDF page graphics after image segmentation. Through the use of segmentation of an image within a user space locality, the image can be processed in accordance with an input Render Matrix and a Render Area that express user space units beyond values reasonably approximated with 32-bit, fixed point integers.

Numerous additional embodiments, benefits and advantages of the methods and apparatus of the present invention are discussed below in the detailed description which follows.

DETAILED DESCRIPTION

Figure 1:
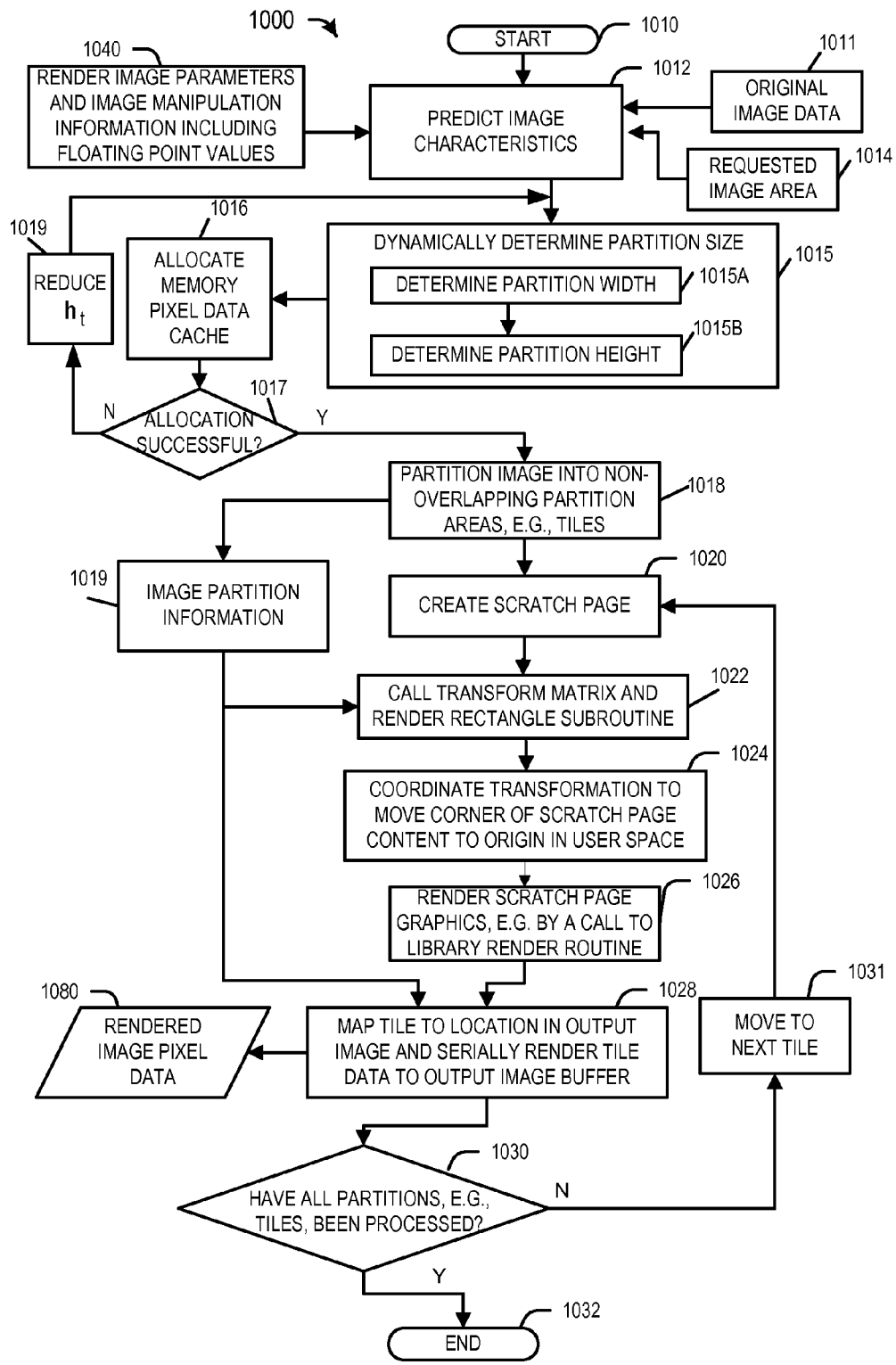
FIG. 1 depicts an exemplary process to render transformed PDF page graphics for remote localities at higher resolutions than could otherwise be expressed with a PDFL's programmable interface in accordance with the present invention.

Some embodiments are directed to methods and apparatus that facilitate production of high-resolution, two-dimensional PDF page renderings for localities beyond the syntax limits imposed with the software PDFL interface which currently uses 32 bit fixed point integer values. While explained in the exemplary context of an embodiment which uses the Adobe PDF function library, it should be appreciated that the methods and apparatus described herein can be used with other imaging function libraries as well. Inputs to the image processing method of the invention may include instances of substitute data structures, modeled with data types, e.g., 32 bit floating point values, that offer superior domains relative to the data types used in the PDFL. The output of the processing implemented in accordance with the invention, in some embodiments, is stored in a one-dimensional memory buffer to which two-dimensional rasterized pixel data from transformed PDF page content is serialized. While the output may be a bitmap image, in some embodiments the output is in a format used by a device, e.g., printer, to represent an image. Thus, in some embodiments the generated image data which is stored in memory is in a device context format, such as a Windows device context format used on some Windows based computer systems.

As previously described, the standard PDFL provides PDF rendering services which can be controlled with a (1) transformation matrix and a (2) rectangle, both of which are declared as vectors of 32-bit, fixed point integers that describe PDF user space values. The method of the present invention, in some embodiments, provides a similar interface that accepts, as input, a matrix $M_{RM}$ and rectangle $R_A$. However, the inputs to the method of the present invention are declared using a data type possessing superior domain relative to 32-bit, fixed point integer. An exemplary process may provide a complimentary interface to accept the input matrix $M_{RM}$ and rectangle $R_A$ in terms of higher-level abstractions that model characteristics of the Rendered Image, including, but not limited to, one or more of the following inputs: 1) a page location, 2) an area, expressed in physical units such as inches or centimeters, 3) resolution, expressed in DPI (dots per inch), 4) a rotation angle, expressed in degrees, e.g., clockwise, 5) a flip toggle, 6) a color space name, and 7) a bit depth.

In various embodiments the method accepts render requests in terms of these data structures but ultimately transforms the render requests so that they are represented, for an image segment, in accordance with the standard PDFL syntax and using the format, e.g. 32 bit fixed point integer format, used by the PDFL interface. The method achieves this through the use of deliberate page transformations, prior to rendering, including e.g., shifting of the area to be rendered close to the origin of the space in which rendering is performed, thereby allowing equivalent input parameters, relative to the new coordinate system origin, that can be expressed directly with constrained, e.g., 32 bit fixed point values, which may be required by the PDFL interface.

To fulfill a render request, the process may, and in some embodiments does, calculate the expected characteristics of a Rendered Image, including, but not limited to, 1) width and 2) height, expressed as pixels at image resolution, 3) stride, expressed as bytes per row of pixel data, and 4) pixel data length, expressed as total bytes of pixel data. For those Render Area instances that cannot be directly expressed using the permitted PDFL syntax, the process partitions the Rendered Image into a grid of rectangular segments, e.g., tiles, which can individually be expressed using standard PDFL syntax.

In some embodiments, similar to a Rendered Image, a tile is expressed in terms of a 1) page location, expressed in physical units such as inches or centimeters, a 2) color space name, 3) bit depth, 4) width and 5) height, expressed as pixels at image resolution, 6) stride, expressed as bytes per row of pixel data, and 7) pixel data length, expressed as total bytes of pixel data.

From these parameters the method of the present invention derives a set of transformation matrices for a specific segment that are deliberately multiplied to form $M_{RM1}$ and $M_{RM2}$, such that $M_{RM1}M_{RM2}=M_{RM}$. The process directs the PDFL to first explicitly transform PDF page content using $M_{RM1}$ and then render the segment using matrix $M_{RM2}$ and area $R_t$ to produce segment pixel data. For each row of segment pixel data produced, the segment pixel data overlapping the Rendered Image pixel data is copied to a Rendered Image pixel data buffer. After pixel data is copied from all overlapping rows, the next segment is processed and the resulting output is serialized to the output buffer. After pixel data is copied from each of the segments, the render request is complete.

Consider the previous example which attempted to render PDF page graphics inside the top-right, 2"×2" locality of a 127"×90" PDF page at six times (×6) device resolution using Render Matrix $M_{RM}$ and Render Area $R_{A,RM}$ but failed because calculated user space values could not be approximated with 32-bit, fixed point integers.

$$M_{RM} = \begin{bmatrix} 5.33 & 0 & 0 \\ 0 & -5.33 & 0 \\ -47970 & 34538.4 & 1 \end{bmatrix}$$

$$R_{A,RM} = \{0, 0, 767.52, 767.52\}$$

Assume, for this example, that only one Tile is required to service the render request for locality $R_A$. The intermediate matrices used to calculate $M_{RM}$ are used to identify the matrices $M_{RM1}$ and $M_{RM2}$ discussed in this invention.

$$M_{RM} = M_{RM1} M_{RM2}$$

$$M_{RM} = M_{DPM} M_F M_T M_S$$

$$M_{RM} = (M_{DPM} M_F M_T)(M_S)$$

$$M_{RM1} = M_{DPM} M_F M_T$$

$$M_{RM2} = M_S$$

Figure 23:
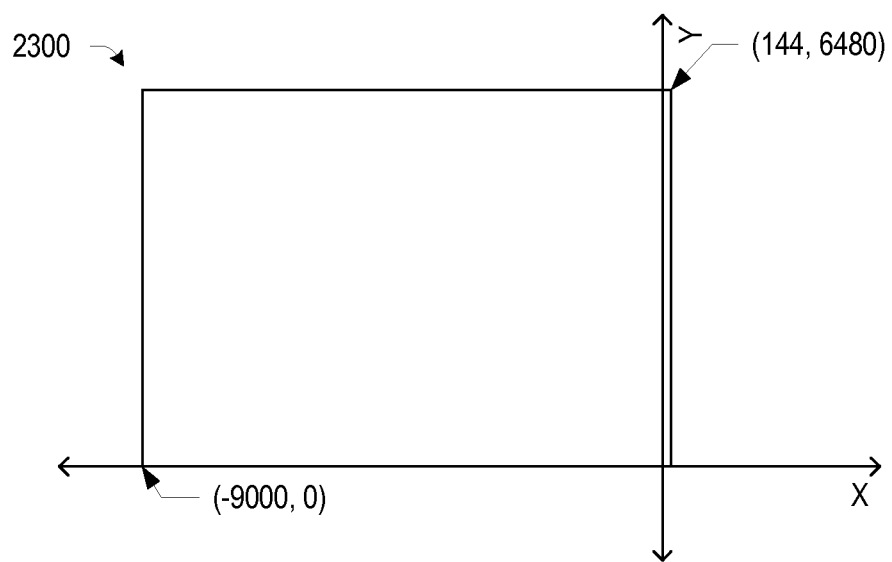
FIG. 23 depicts a 127"×90" PDF page transformed with a Default Page Matrix, Flip Matrix, and Translate Matrix.

The PDF page is transformed with matrix $M_{RM1}$. This transformation can be illustrated using the function g(R, M) to transform rectangle $R_{crop}$ with matrix $M_{RM1}$. See, for example rectangle 2300 of FIG. 23.

$$M_{RM1} = M_{DPM} M_F M_T$$

$$M_{RM1} = \begin{bmatrix} 1 & 0 & 0 \\ 0 & 1 & 0 \\ 0 & 0 & 1 \end{bmatrix} \begin{bmatrix} 1 & 0 & 0 \\ 0 & -1 & 0 \\ 0 & 6480 & 1 \end{bmatrix} \begin{bmatrix} 1 & 0 & 0 \\ 0 & 1 & 0 \\ -9000 & 0 & 1 \end{bmatrix}$$

$$M_{RM1} = \begin{bmatrix} 1 & 0 & 0 \\ 0 & -1 & 0 \\ -9000 & 6480 & 1 \end{bmatrix}$$

$$R_{crop} = \{0, 0, 9144, 6480\}$$

$$R_{crop,RM1} = g(R_{crop}, M_{RM1})$$

$$R_{crop,RM1} \equiv \begin{bmatrix} 0 & 0 & 1 \\ 0 & 6480 & 1 \\ 9144 & 0 & 1 \\ 9144 & 6480 & 1 \end{bmatrix} \begin{bmatrix} 1 & 0 & 0 \\ 0 & -1 & 0 \\ -9000 & 6480 & 1 \end{bmatrix}$$

$$R_{crop,RM1} \equiv \begin{bmatrix} -9000 & 6480 & 1 \\ -9000 & 0 & 1 \\ 144 & 6480 & 1 \\ 144 & 0 & 1 \end{bmatrix}$$

$$R_{crop,RM1} = \{-9000, 0, 144, 6480\}$$

Figure 21:
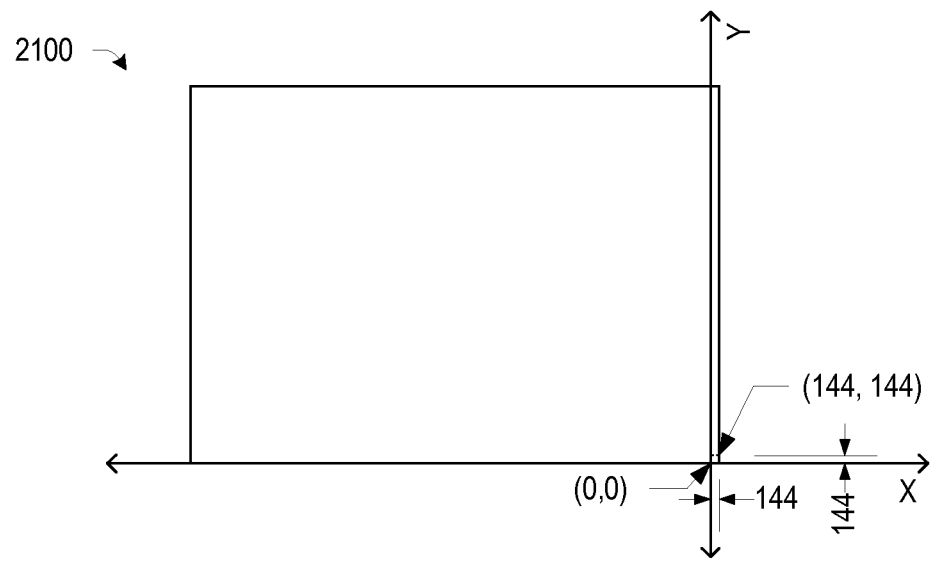
FIG. 21 depicts the Render Area corresponding to a 2"×2" locality at the top-right corner of a 127"×90" PDF page in flipped, translated page space.

Additionally, the function g(R, M) is used to transform rectangle $R_A$ with the Render Matrix $M_{RM1}$ so that the requested area logically covers the same 2"×2" locality on the PDF page. See, e.g., rectangle 2100 of FIG. 21.

$$R_{A,RM1} = g(R_A, M_{RM1})$$

$$R_{A,RM1} \equiv \begin{bmatrix} 9000 & 6336 & 1 \\ 9000 & 6480 & 1 \\ 9144 & 6336 & 1 \\ 9144 & 6480 & 1 \end{bmatrix} \begin{bmatrix} 1 & 0 & 0 \\ 0 & -1 & 0 \\ -9000 & 6480 & 1 \end{bmatrix}$$

$$R_{A,RM1} \equiv \begin{bmatrix} 0 & 144 & 1 \\ 0 & 0 & 1 \\ 144 & 144 & 1 \\ 144 & 0 & 1 \end{bmatrix}$$

$$R_{A,RM1} = \{0, 0, 144, 144\}$$

Figure 22:
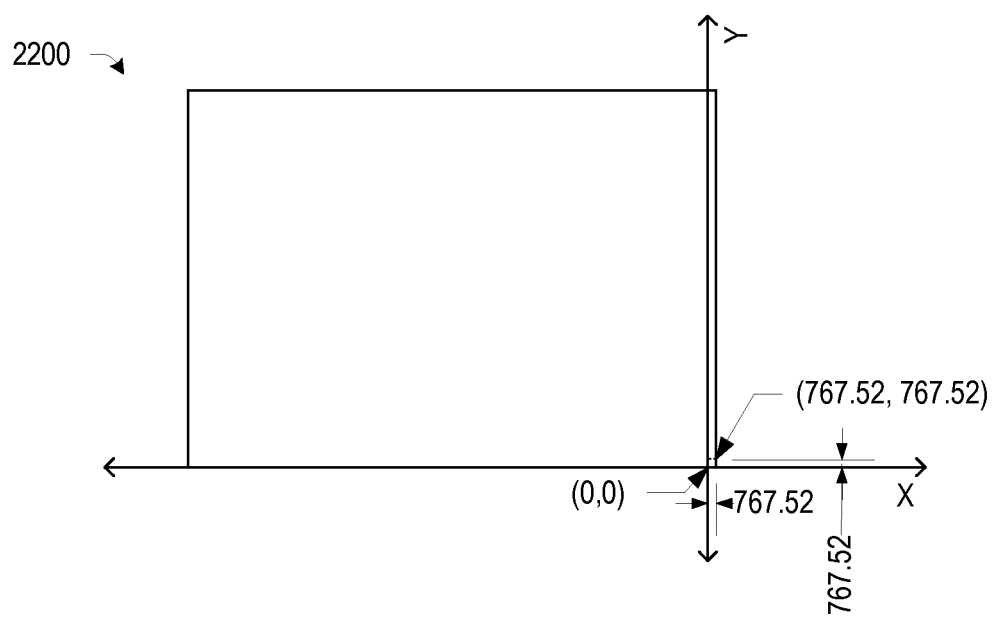
FIG. 22 depicts the Render Area corresponding to a 2"×2" locality at the top-right corner of a 127"×90" PDF page in device space (flipped, translated, scaled page space).

After the page is transformed with $M_{RM1}$ the Render Area $R_{A,RM}$ is calculated using the function g(R, M) to transform rectangle $R_{A,RM1}$ with the Render Matrix $M_{RM2}$ so that the requested area logically covers the same 2"×2" locality on the PDF page. See rectangle 2200 of FIG. 22.

$$R_{A,RM} = g(R_{A,RM1}, M_{RM2})$$

$$R_{A,RM} \equiv \begin{bmatrix} 0 & 144 & 1 \\ 0 & 0 & 1 \\ 144 & 144 & 1 \\ 144 & 0 & 1 \end{bmatrix} \begin{bmatrix} 5.33 & 0 & 0 \\ 0 & 5.33 & 0 \\ 0 & 0 & 1 \end{bmatrix}$$

$$R_{A,RM} \equiv \begin{bmatrix} 0 & 767.52 & 1 \\ 0 & 0 & 1 \\ 767.52 & 767.52 & 1 \\ 767.52 & 0 & 1 \end{bmatrix}$$

$$R_{A,RM} = \{0, 0, 767.52, 767.52\}$$

To render page graphics inside the top-right 2"×2" locality of a 127"×90" PDF page at six times (×6) device resolution, the PDF page is first transformed with matrix $M_{RM1}$, and then rendered using Render Matrix $M_{RM2}$ and Render Area $R_{A,RM}$, which can be expressed using the PDFL interface.

$$M_{RM1} = \begin{bmatrix} 1 & 0 & 0 \\ 0 & -1 & 0 \\ -9000 & 6480 & 1 \end{bmatrix}$$

$$M_{RM2} = \begin{bmatrix} 5.33 & 0 & 0 \\ 0 & 5.33 & 0 \\ 0 & 0 & 1 \end{bmatrix}$$

$$R_{A,RM} = \{0, 0, 767.52, 767.52\}$$

The success of this approach is contingent on the existence of $M_{RM1}$ and $M_{RM2}$ and the PDFL fulfilling requests to (1) render, and (2) to either mutate existing graphics or copy existing graphics to a mutable scratch page.

FIG. 1 depicts an exemplary embodiment of the invention in which a process serializes a continuous segment of Rendered Image pixel data bytes. The process starts in Step 1010. The process will copy segments of Rendered Image pixel data to a sufficiently sized memory buffer, given a byte offset from the start of the Rendered Image pixel data buffer and the number of consecutive bytes to copy.

Input 1040 represents the specification of render parameters to the process. These parameters may be fixed in the computer program that governs the process, or stored in memory at the start of the process. In the preferred embodiment, the parameters specify the Render Area, a rectangular locality of (1) width $w_a$ and (2) height $h_a$ relative to its (3) bottom-left corner $(x_a, y_a)$ on the PDF page, expressed in physical units such as inches, (see, e.g., width $(w_a)$ and height $(h_a)$ of render area in the larger image 5000 shown in FIG. 5); a (4) clockwise rotation angle Θ expressed in degrees clockwise; (5) a flip toggle; the (6) horizontal image resolution $r_x$ and (7) vertical image resolution $r_y$, expressed in dots per inch (DPI); the (8) normalized color space name cs, such as DeviceGray or DeviceRGB; the (9) image bit depth bpp, which identifies the number of significant bits required to express a single color space value. User space resolution, denoted as $r_u$, is typically 72.0 DPI. In some embodiments, the image parameters and image manipulation information supplied in input 1040 includes floating point values, e.g., 32 bit floating point values, some of which can not be expressed using 32 bit fixed pointer integer values given the size of the floating point values being specified.

Other parameters may be specified to further configure the PDFL for quality—such as smoothing text, images and line art—or to handle specific PDF page graphics—such as toggling optional content layers or PDF Annotation appearances. These variants are complimentary to this invention and may be part of the input 1040. Another input to the method 1000 is information 1014 indicating an image area for which a rendering request has been made. The original image data may be in, e.g., a PDF format.

In Step 1012 the method calculates expected characteristics of the Rendered Image from the parameters in received input 1040 and the render area indicated in 1014. Information used in Step 1012 includes (1) width $w_i$ and (2) height $h_i$, expressed as pixels at image resolution, the (3) stride $s_i$, expressed as bytes per row of pixel data, aligned to DWORD (32-bit) boundaries, and (4) pixel data length $z_i$, expressed as total bytes of pixel data. The image characteristics can be used to allocate a precise one-dimensional output buffer to fulfill byte requests when system resources are limited.

$$w_i = w_a \times \frac{r_x}{r_u}$$

$$h_i = w_h \times \frac{r_y}{r_u}$$

$$s_i = \left\lceil \frac{w_i \times bpp}{32 \text{ bits}} \right\rceil \times 4 \text{ bytes}$$

$$z_i = s_i \times h_i$$

Note that image stride $s_i$ calculation will round-up to the nearest multiple of 32-bits to achieve DWORD (32-bit) alignment.

Input 1014 represents a specific Rendered Image pixel data byte sequence that is to be provided. A one-dimensional vector of image pixel data is denoted as $I_{p,n}$, where p is the logical byte position from the beginning of a Rendered Image pixel data buffer, and n is the number of consecutive bytes.

$$I_{p,n}: p \in \mathbb{Z}, n \in \mathbb{Z}, p \geq 0, n > 0, p+n < z_i$$

In an exemplary embodiment, the storage for the Rendered Image pixel data is allocated based on the image characteristics calculated in Step 1012. In step 1015 a partition size to be used in partitioning the image to be rendered is determined. The Rendered Image pixel data byte sequence can be expressed as $I_{0,z_{i-1}}$. The partition size is determined so that the Render Area $R_A$ as well as the rendered image pixel data byte sequence can be expressed as user space units using 32-bit, fixed point integers. In step 1015, the partition width is first determined and then the partition height with the objective being to minimize the number of partitions required for the rendering while allowing for the use of 32 bit fixed point integers to express the necessary input and output values needed to render each partition area.

In some embodiments the render area $R_A$ may be expressed as follows:

$$R_A = \{x_a, y_a, x_a+w_a, y_a+h_a\}$$

In Step 1015 the process selects the characteristics for a Tile to partition the Rendered Image. In an exemplary embodiment, the Tile width $w_t$ and height $h_t$ are selected to achieve (1) valid representation with user space units expressed using 32-bit, fixed point integers and within the limits of (2) the availability of memory for a corresponding data buffer, sized to hold a vector of $z_t$ bytes of rendered Tile pixel data. See FIG. 6 which illustrates a tile render area 6000. The values $w_t$, $h_t$, and $z_t$ are initialized to $w_i$, $h_i$, and $z_i$, respectively.

Operation proceeds from step 1015 to step 1016 in which a memory allocation is made for a buffer that occupies $z_t$ bytes. If in step 1017 it is determined that the memory allocation fails, e.g., due to a lack of sufficient available memory for the buffer, then $h_t$ is reduced in step 1019 and operation proceeds once again to step 1016 wherein a new memory allocation attempt is made. This heuristic is repeated until the memory allocation succeeds, or a predetermined number of failures are encountered. After all permitted memory allocation attempts are exhausted without success, an Exception is thrown to abort the process. Otherwise, with the successful allocation of memory, the process advances to Step 1018.

Other embodiments may choose to reduce Tile width with the understanding that the PDFL will bit-pad stride to an even multiple of 32-bit (DWORD) boundaries, which may complicate serializing the Tile pixel data. Consider a Tile width that requires bit-padding to achieve a DWORD-aligned stride. The bit-padding intrinsic to interior Tile pixel data, if ignored when serializing into the Image pixel data buffer, may introduce bad color values visually detected in two-dimensional renderings of the assembled Image as a black vertical line.

Figure 7:
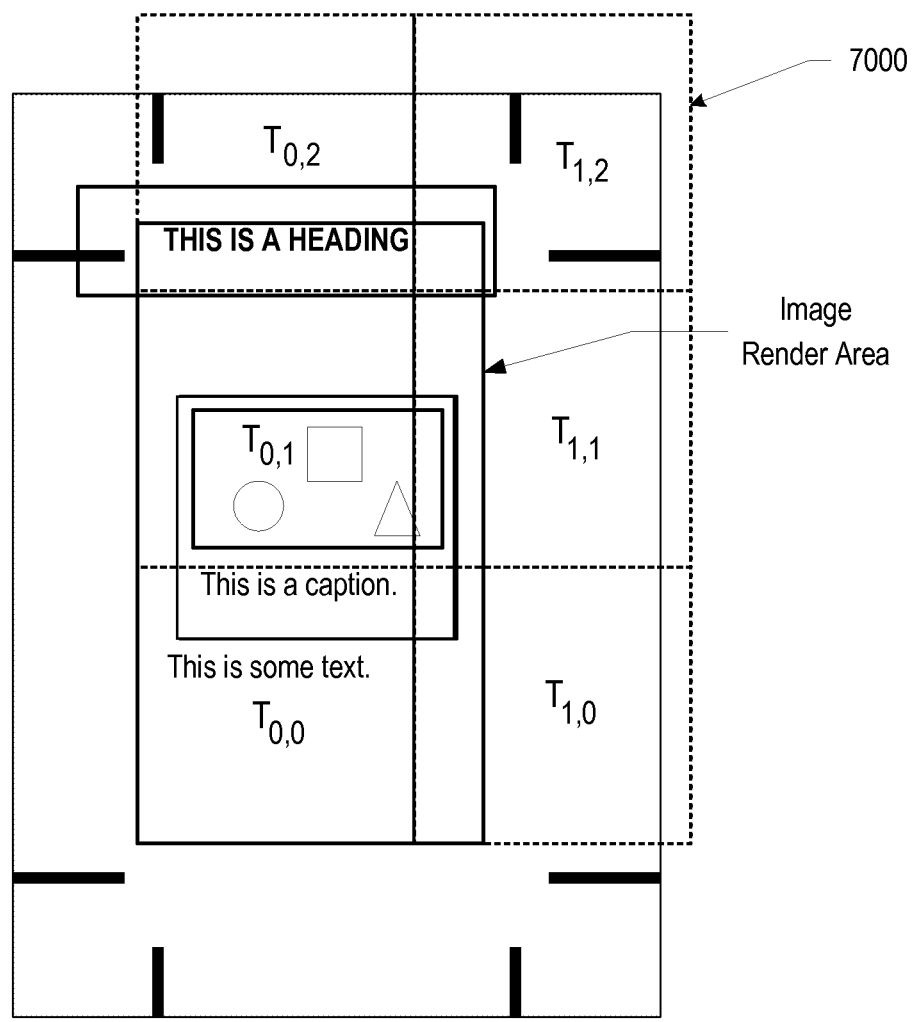
FIG. 7 depicts the Rendered Image in terms of a two-dimensional grid of non-overlapping Tiles whose pixel data is individually rendered then serialized as Rendered Image pixel data, super-imposed over the sample PDF page containing text content and image graphics.

In Step 1018, the Image is partitioned into a two-dimensional grid 7000 of non-overlapping Tiles as shown in FIG. 7 that run from left-to-right, bottom-to-top, identified semantically as $T_{x,y}$.

$$T_{x,y}: x \in Z, y \in Z, 0 \le x \le \left\lceil \frac{w_i}{w_t} \right\rceil, 0 \le y \le \left\lceil \frac{h_i}{h_t} \right\rceil$$

Each Tile is checked for bytes overlapping the requested Rendered Image pixel data. If pixel data from $T_{x,y}$, intersects $I_{p,n}$, then Steps 1020-1028 are performed for the locality corresponding to $T_{x,y}$.

In Step 1020 the process directs the PDFL to create a scratch PDF document to hold a duplicated source PDF page. The Scratch Page insulates the source PDF page from user space coordinate system transformations necessary to fulfill the rendering request. The process releases the Scratch Page after the Tile pixel data is produced in Step 1026. In an exemplary embodiment, the process may direct the PDFL to insert the source PDF page into the scratch PDF document. Alternatively, the process may direct the PDFL to add an empty PDF page to the scratch PDF document, and then copy visible graphics from the source PDF page to the Scratch Page. The PDFL is expected to restrict these operations to PDF documents opened with the "Page Extraction" permission granted.

Step 1022 produces three data structures (1) a Pre-Render Matrix, (2) a Render Matrix and (3) a Render Area rectangle which are inputs to process steps 1024 and 1026, respectively.

In Step 1022 the process follows Steps 2010-2028 of a transformation matrix and render subroutine 2000 used to calculate $M_{RM1}$, $M_{RM2}$ and $R_A$ appropriate to render $T_{x,y}$.

In Step 2040, the parameters include the Render parameters specified in Step 1040, the Tile characteristics identified in Step 1016 and the bottom-left coordinate $P_{bl}$ of the locality on the Scratch Page corresponding to $T_{x,y}$.

In Step 2012 the process composes the Default Page Matrix $M_{DPM}$ to transform PDF user space coordinates to rotated, cropped page space. The Default Page Matrix is created from the effective PDF page crop box $R_{crop}$ and intrinsic rotation of a PDF page $\delta$, expressed in degrees clockwise.

$$R_{crop} = \{x_0, y_0, x_1, y_1\}$$

$$M_r = \begin{bmatrix} \cos\delta & -\sin\delta & 0 \\ \sin\delta & \cos\delta & 0 \\ 0 & 0 & 1 \end{bmatrix}$$

$$R_{crop,r} = g(R_{crop}, M_r)$$

$$R_{crop,r} = \{x_2, y_2, x_3, y_3\}$$

$$M_t = \begin{bmatrix} 1 & 0 & 0 \\ 0 & 1 & 0 \\ -x_2 & -y_2 & 1 \end{bmatrix}$$

$$M_{DPM} = M_t M_r$$

$$M_{DPM} = \begin{bmatrix} 1 & 0 & 0 \\ 0 & 1 & 0 \\ -x_2 & -y_2 & 1 \end{bmatrix} \begin{bmatrix} \cos\delta & -\sin\delta & 0 \\ \sin\delta & \cos\delta & 0 \\ 0 & 0 & 1 \end{bmatrix}$$

$$M_{DPM} = \begin{bmatrix} \cos\delta & -\sin\delta & 0 \\ \sin\delta & \cos\delta & 0 \\ t_x & t_y & 1 \end{bmatrix}$$

$$t_x = -x_2 \cos\delta - y_2 \sin\delta$$

$$t_y = x_2 \sin\delta - y_2 \cos\delta$$

In Step 2014 the process composes the Flip Matrix $M_F$ to reflect page space across the x-axis. Additionally, the Flip Matrix translates coordinates to ensure that the bottom-left corner of the PDF page crop box rectangle $R_{crop}$, when expressed in page space, is located at the origin.

$$R_{crop} = \{x_0, y_0, x_1, y_1\}$$

$$R_{crop,DPM} = g(R_{crop}, M_{DPM})$$

$$R_{crop,DPM} = \{x_4, y_4, x_5, y_5\}$$

$$M_F = \begin{bmatrix} 1 & 0 & 0 \\ 0 & -1 & 0 \\ 0 & h & 1 \end{bmatrix}$$

$$h = -y_5$$

In Step 2016 the process composes a Rotate Matrix $M_R$ to rotate coordinates $\Theta$ degrees clockwise about the origin. Additionally, the Rotate Matrix translates coordinates to ensure that the page space origin is preserved in the transformation.

$$R_{crop} = \{x_0, y_0, x_1, y_1\}$$

$$M_u = \begin{bmatrix} \cos\Theta & -\sin\Theta & 0 \\ \sin\Theta & \cos\Theta & 0 \\ 0 & 0 & 1 \end{bmatrix}$$

$$R_{crop,r} = g(R_{crop}, M_u)$$

$$R_{crop,u} = \{x_6, y_6, x_7, y_7\}$$

$$M_t = \begin{bmatrix} 1 & 0 & 0 \\ 0 & 1 & 0 \\ x_6 - x_0 & y_6 - y_0 & 1 \end{bmatrix}$$

$$M_R = M_t M_r$$

$$M_R = \begin{bmatrix} 1 & 0 & 0 \\ 0 & 1 & 0 \\ x_6 - x_0 & y_6 - y_0 & 1 \end{bmatrix} \begin{bmatrix} \cos\Theta & -\sin\Theta & 0 \\ \sin\Theta & \cos\Theta & 0 \\ 0 & 0 & 1 \end{bmatrix}$$

$$M_R = \begin{bmatrix} \cos\Theta & -\sin\Theta & 0 \\ \sin\Theta & \cos\Theta & 0 \\ u_x & u_y & 1 \end{bmatrix}$$

$$u_x = (x_6 - x_0)\cos\Theta + (y_6 - y_0)\sin\Theta$$

$$u_y = (x_0 - x_6)\sin\Theta + (y_6 - y_0)\cos\Theta$$

In Step 2018 the process composes the Translate Matrix $M_T$ to shift the page space origin to the locality identified in Step 2040.

$$P_{bl} = \begin{bmatrix} x_{bl} & y_{bl} & 1 \end{bmatrix}$$

$$M_T = \begin{bmatrix} 1 & 0 & 0 \\ 0 & 1 & 0 \\ v_x & v_y & 1 \end{bmatrix}$$

$$v_x = -x_{bl}$$

$$v_y = -y_{bl}$$

In Step 2020 the process composes the Scale Matrix $M_S$ to scale the size of user space units $r_u$ for the current page, to the Tile resolution, $T_x$ and $T_y$, specified in Step 2040.

$$M_s = \begin{bmatrix} s_x & 0 & 0 \\ 0 & s_y & 0 \\ 0 & 0 & 1 \end{bmatrix}$$

$$s_x = \frac{r_x}{r_u}$$

$$s_y = \frac{r_y}{r_u}$$

In Step 2022 the process multiplies the Default Page Matrix (Step 2012) the Flip Matrix (Step 2014) the Rotate Matrix (Step 2016) and the Translate Matrix (Step 2018) to produce the matrix $M_{RM1}$.

$$M_{RM1} = M_{DPM} M_F M_R M_T$$

In Step 2024 the process identifies the Render Matrix $M_{RM2}$ as the Scale Matrix (Step 2020)

$$M_{RM2} = M_S$$

Figure 6:
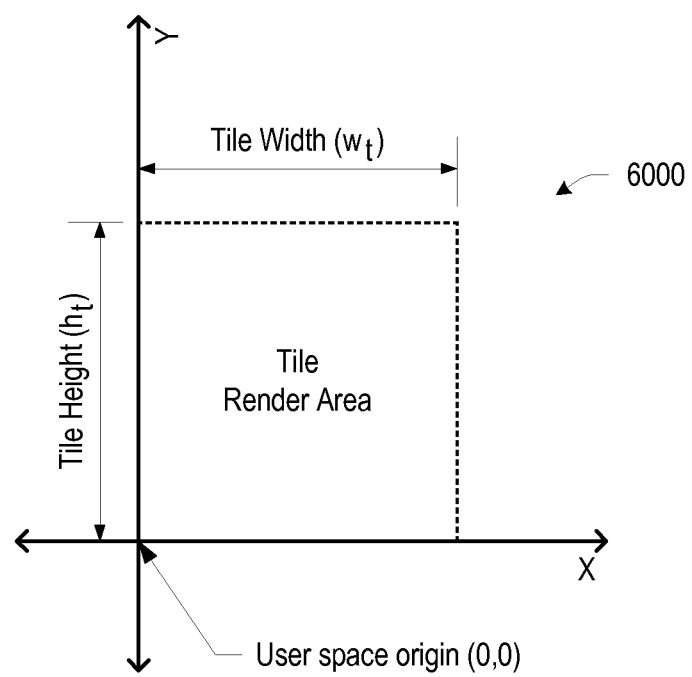
FIG. 6 depicts an exemplary Tile Render Area rectangle, located at the user space origin, possessing width $w_t$ and height $h_t$ that is used to direct the PDFL to render transformed PDF page graphics.

In Step 2026 the process calculates the Render Area $R_t$ from the physical dimensions of the Tile (Step 2040) expressed as user space units. The Tile Render Area is located at the user space origin as shown in FIG. 6.

$$R_t = \{0, 0, w_t, h_t\}$$

In Step 1024 the process directs the PDFL to transform all Scratch Page (Step 1020) boxes, visible graphics and annotations using the matrix $M_{RM1}$ (Step 2022).

In Step 1026 the process directs the PDFL to render Scratch Page (Step 1020) graphics using Render Matrix $M_{RM2}$ (Step 2024) and Tile Render Area $R_t$ (Step 2022) to the allocated one-dimensional Tile pixel data buffer. If the complete Rendered Image was requested in Step 1014 and the Tile dimensions are identical to the Rendered Image dimensions, then the process proceeds to Step 1032. Otherwise the process advances to Step 1028.

In Step 1028 Tile pixel data overlapping the Rendered Image pixel data requested in Step 1014 is copied to the Rendered Image pixel data buffer. It can be assumed that no more than one consecutive sequence of bytes in the current Tile pixel data row overlaps the Image pixel data requested. For each row of Tile pixel data produced, the first and last byte offsets, relative to the beginning of the one-dimensional Tile pixel data buffer, are mapped to the logical offsets in the one-dimensional Rendered Image pixel data buffer. These offsets are compared to the requested Rendered Image pixel data byte offset range (Step 1040). The overlapping bytes, if any, are copied from the Tile buffer to the Rendered Image buffer. After all Tile pixel data rows are handled, the process advances to Step 1030.

In Step 1030 the process repeats Steps 1020, 1022, 1024, 1026, 1028, 1030 for the next partition, processing partitions from left-to-right, bottom-to-top until all partitions have been handled. The process advances to Step 1032.

In Step 1032 the process is complete. The Rendered Image pixel data buffer 1080 has been updated with the specific byte range requested in Step 1014.

Figure 3:
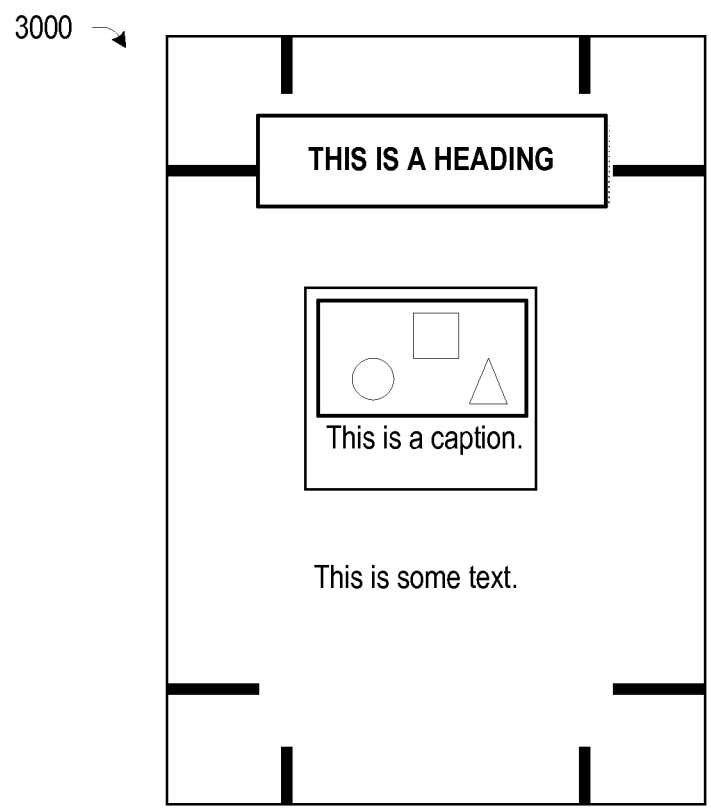
FIG. 3 depicts a sample PDF page containing text content and image graphics.

FIG. 3 illustrates a sample PDF page 3000 containing text content and image graphics. The sample PDF page 3000 can be used as the original image data shown in step 1014 of flowchart 1000.

Figure 4:
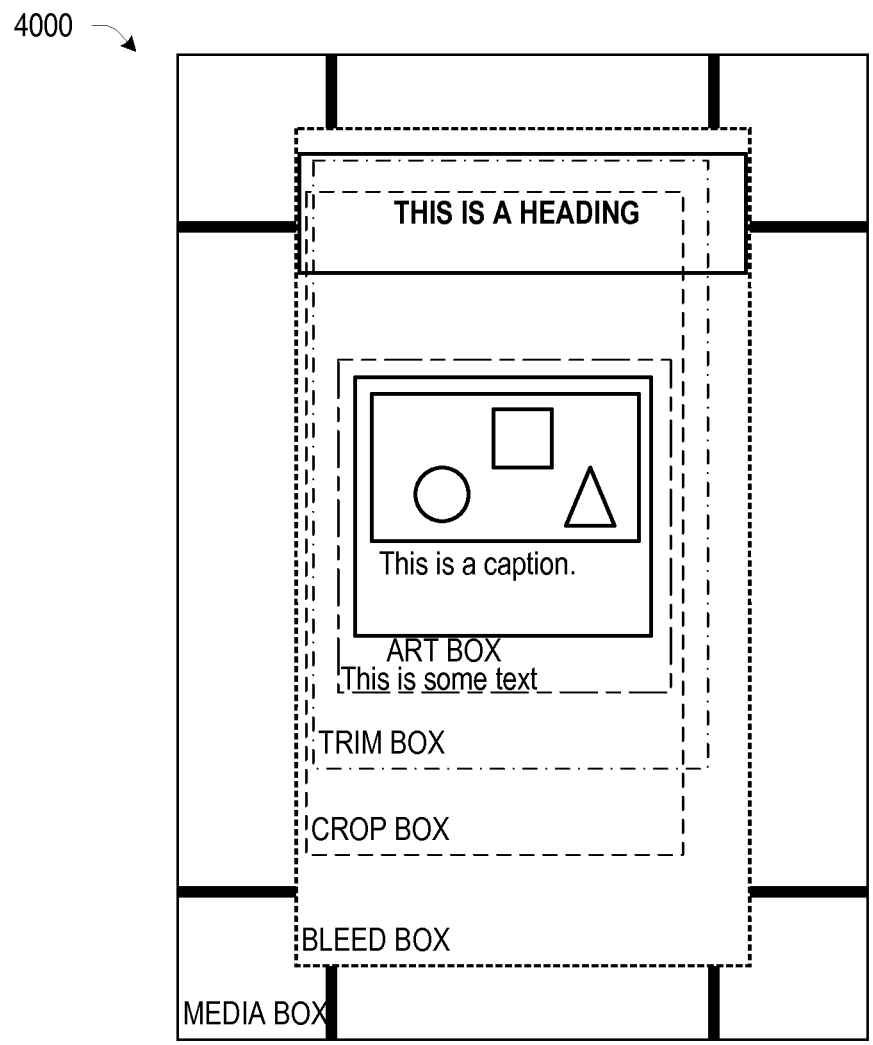
FIG. 4 depicts the media, crop, bleed, trim and art boxes for a sample PDF page containing text content and image graphics.

FIG. 4 illustrates the media, crop, bleed, trim and art boxes for a sample PDF page 4000 containing text content and image graphics.

Figure 5:
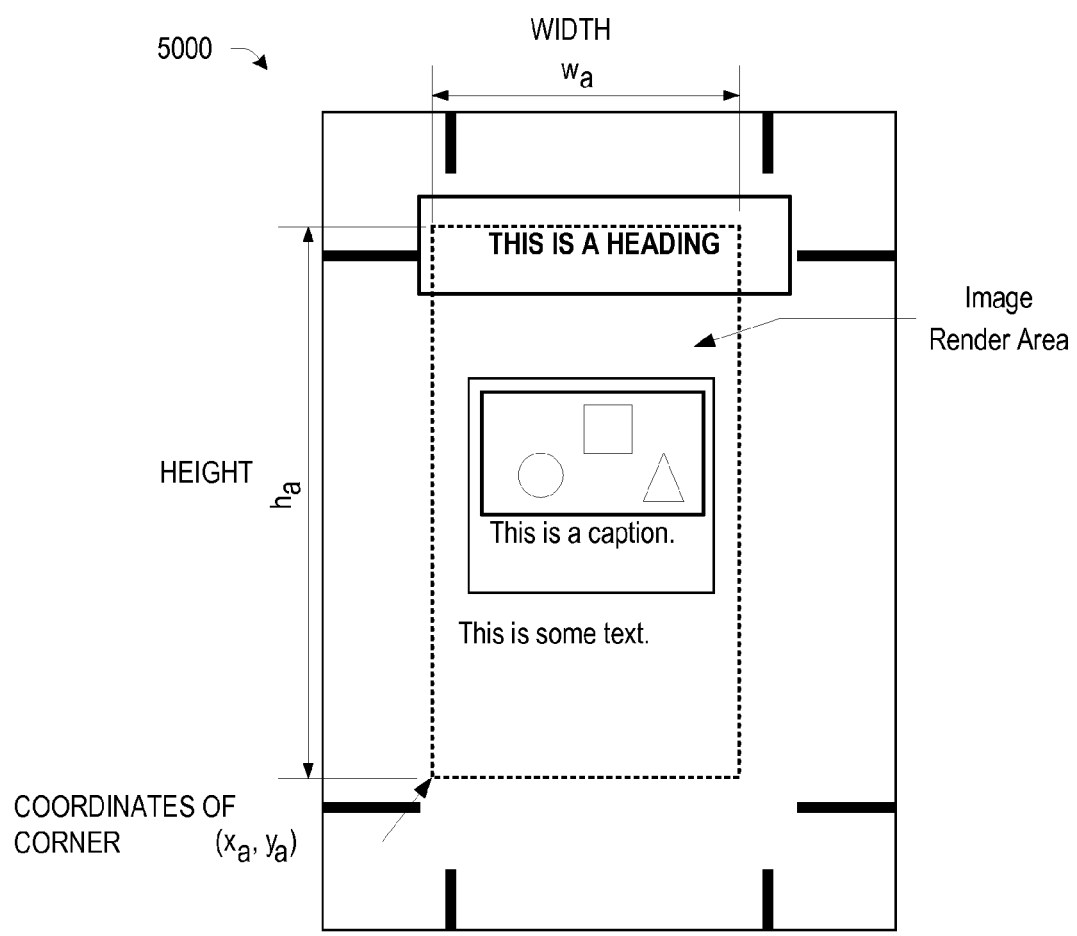
FIG. 5 depicts the Rendered Image Render Area on a sample PDF page containing text content and image graphics.

FIG. 5 illustrates a Rendered Image Render Area on a sample PDF page 5000 containing text content and image graphics. The render parameters specify the Render Area as discussed in step 1040 of the flowchart 1000 of FIG. 1.

FIG. 6 illustrates an exemplary Tile Render Area rectangle 6000, located at the user space origin, possessing width $w_t$ and height $h_t$ that is used to direct the PDFL to render transformed PDF page graphics.

FIG. 7 illustrates the Rendered Image in terms of a two-dimensional grid 7000 of non-overlapping Tiles whose pixel data is individually rendered then serialized as Rendered Image pixel data, super-imposed over the sample PDF page containing text content and image graphics. FIG. 7 shows the result of partitioning the image into non-overlapping Tiles discussed in step 1018 of the flowchart 1000.

Figure 8:
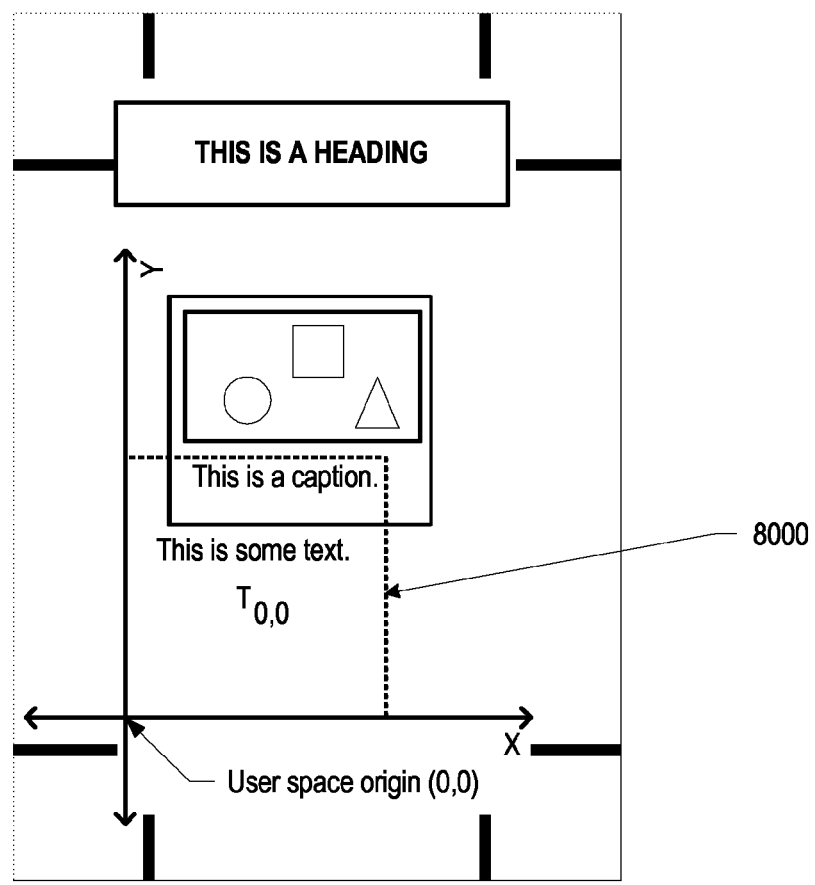
FIG. 8 depicts the transformed user space origin and Tile Render Area used to produce pixel data for $T_{0,0}$ in accordance with the present invention.

FIG. 8 illustrates the transformed user space origin and Tile Render Area 8000 used to produce pixel data for tile $T_{0,0}$ in accordance with the processing done in step 1024 of flowchart 1000.

Figure 9:
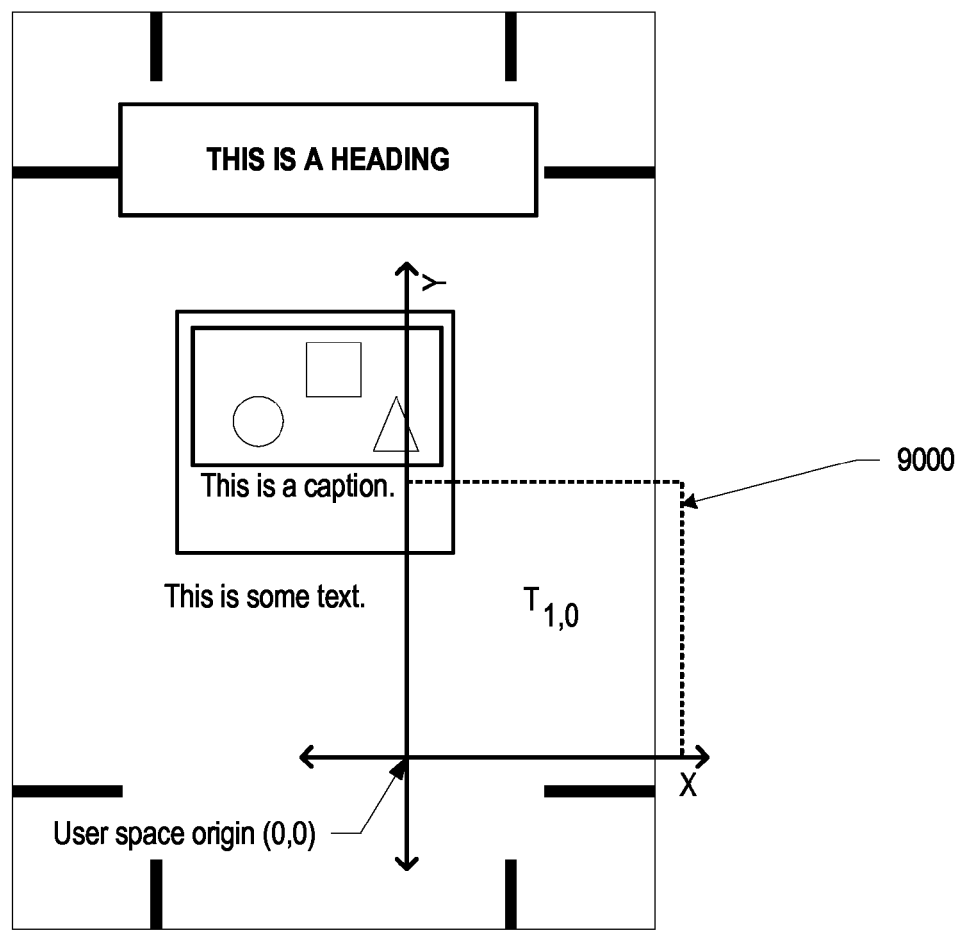
FIG. 9 depicts the transformed user space origin and Tile Render Area used to produce pixel data for $T_{1,0}$ in accordance with the present invention.

FIG. 9 illustrates the transformed user space origin and Tile Render Area 9000 used to produce pixel data for tile $T_{1,0}$ in accordance with the processing done in step 1024 of flowchart 1000.

Figure 10:
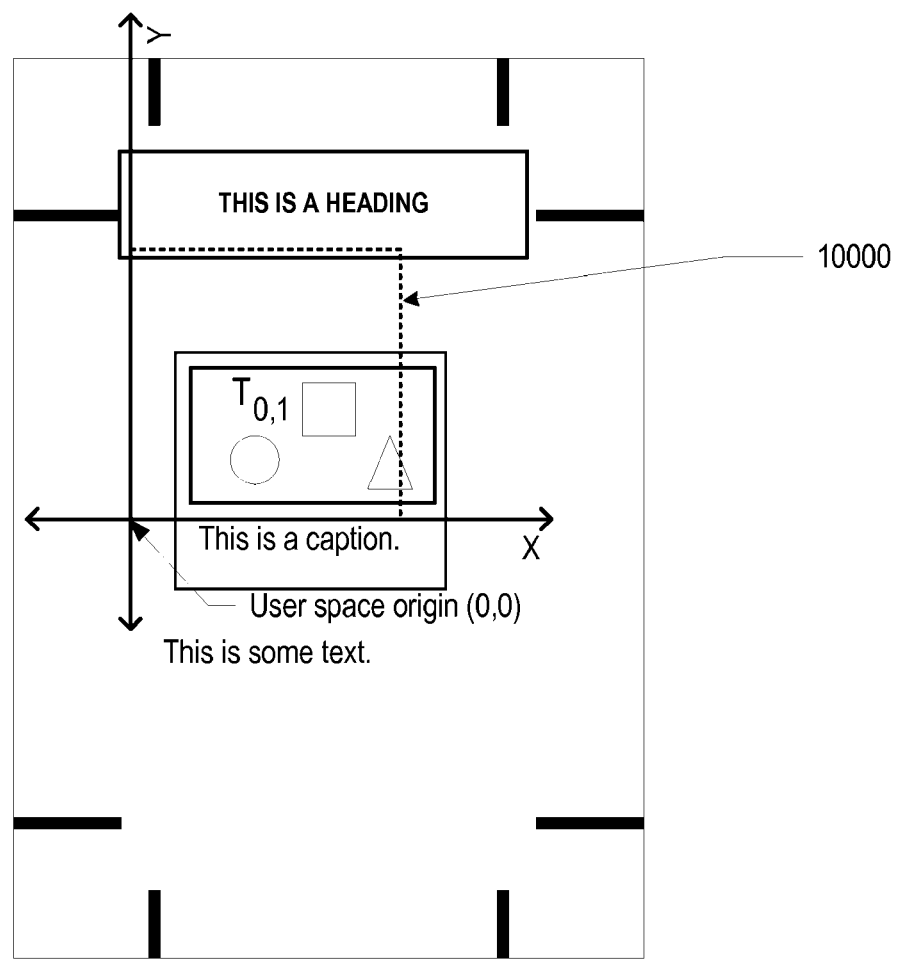
FIG. 10 depicts the transformed user space origin and Tile Render Area used to produce pixel data for $T_{0,1}$ in accordance with the present invention.

FIG. 10 illustrates the transformed user space origin and Tile Render Area 10000 used to produce pixel data for tile $T_{0,1}$. This can be attributed to the processing done in step 1024 of flowchart 1000.

Figure 11:
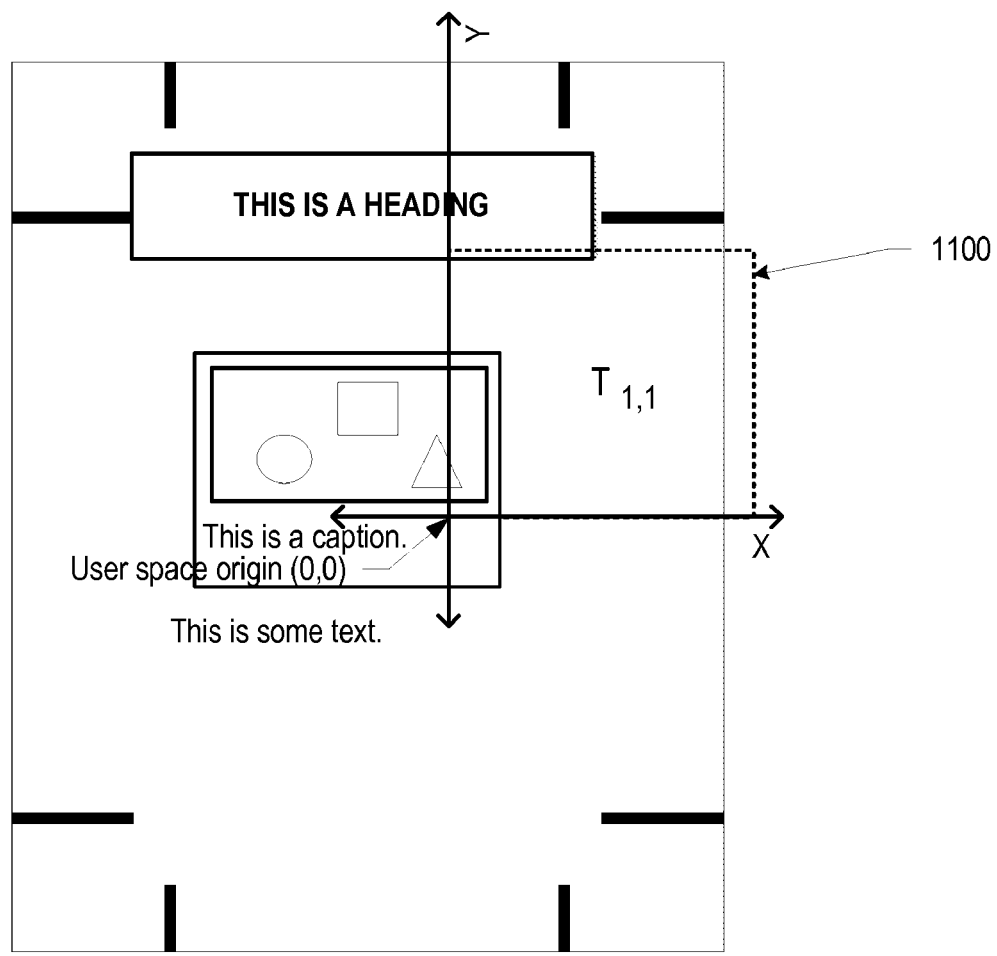
FIG. 11 depicts the transformed user space origin and Tile Render Area used to produce pixel data for $T_{1,1}$ in accordance with the present invention.

FIG. 11 depicts the transformed user space origin and Tile Render Area 1100 used to produce pixel data for tile $T_{1,1}$ in accordance with the processing done in step 1024 of flowchart 1000.

Figure 12:
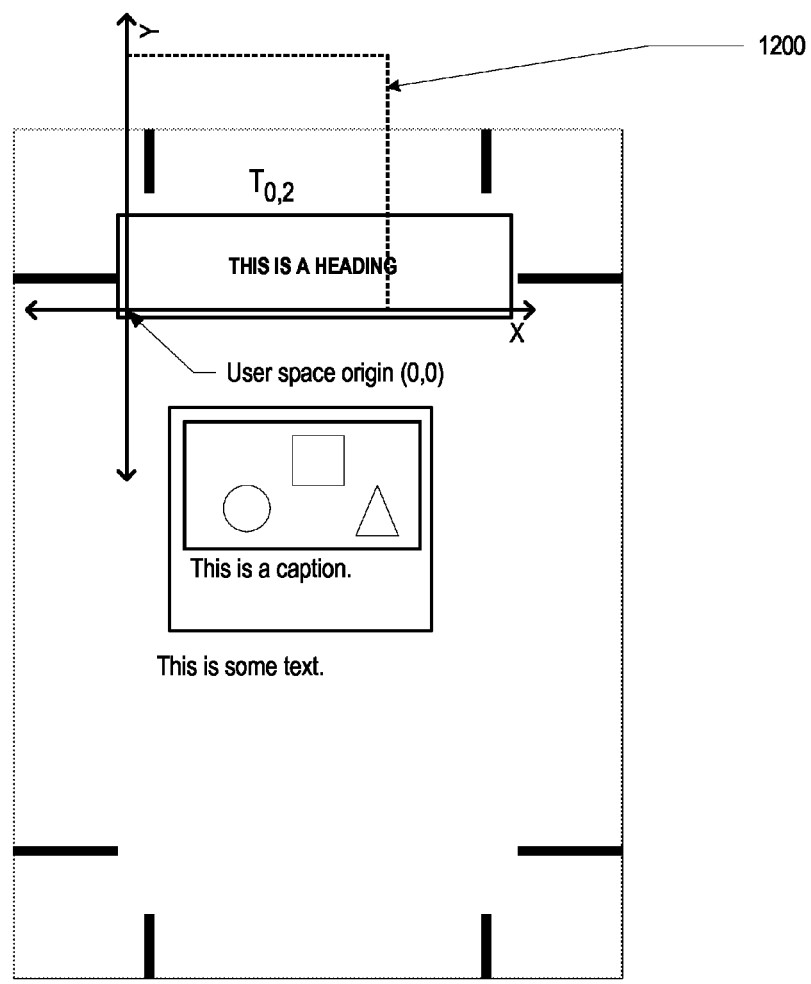
FIG. 12 depicts the transformed user space origin and Tile Render Area used to produce pixel data for $T_{0,2}$ in accordance with the present invention.

FIG. 12 illustrates the transformed user space origin and Tile Render Area 1200 used to produce pixel data for tile $T_{0,2}$ in accordance with the processing done in step 1024 of flowchart 1000.

Figure 13:
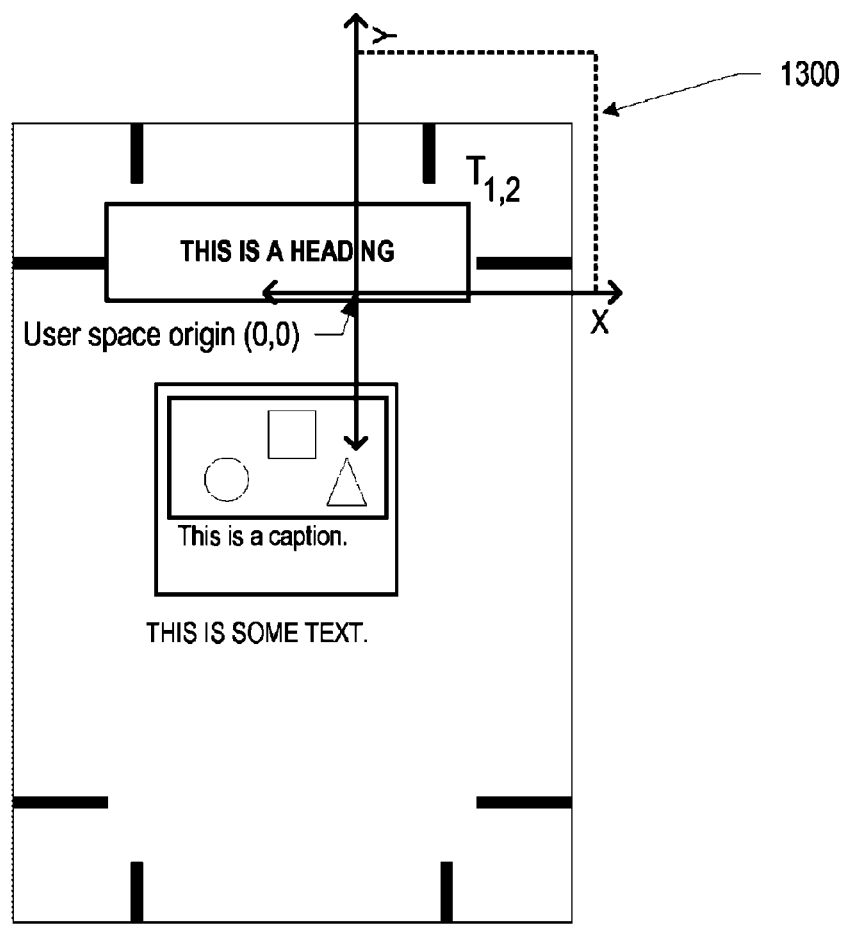
FIG. 13 depicts the transformed user space origin and Tile Render Area used to produce pixel data for $T_{1,2}$ in accordance with the present invention.

FIG. 13 illustrates the transformed user space origin and Tile Render Area 1300 used to produce pixel data for tile $T_{1,2}$ in accordance with the processing done in step 1024 of flowchart 1000.

Figure 14:
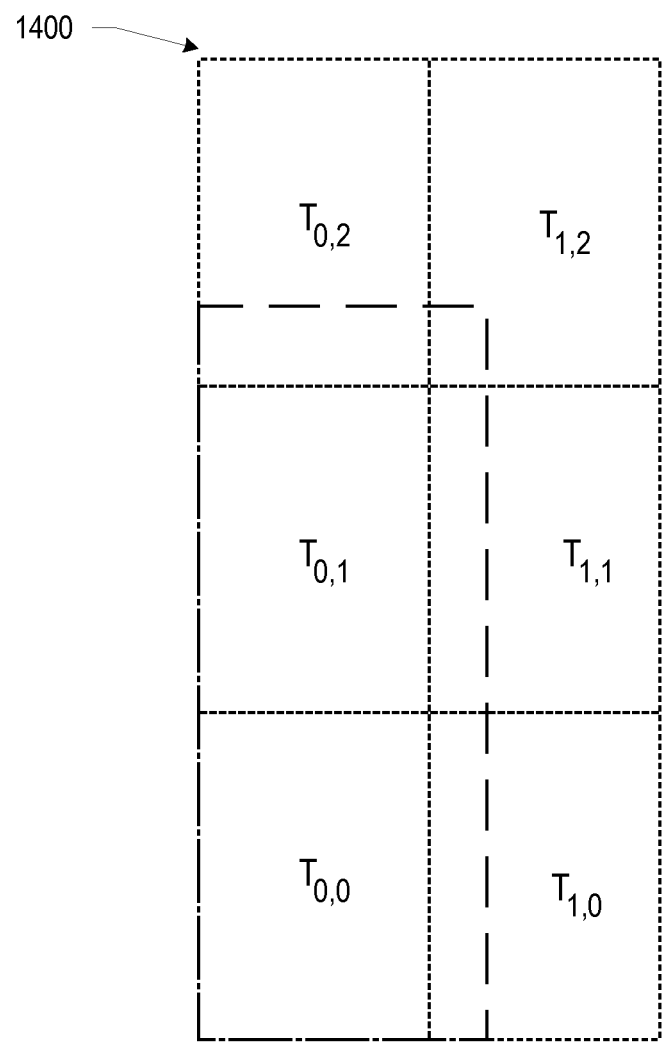
FIG. 14 depicts the Rendered Image in terms of a two-dimensional grid of non-overlapping Tiles whose pixel data is individually rendered then serialized as Rendered Image pixel data.
Figure 15:
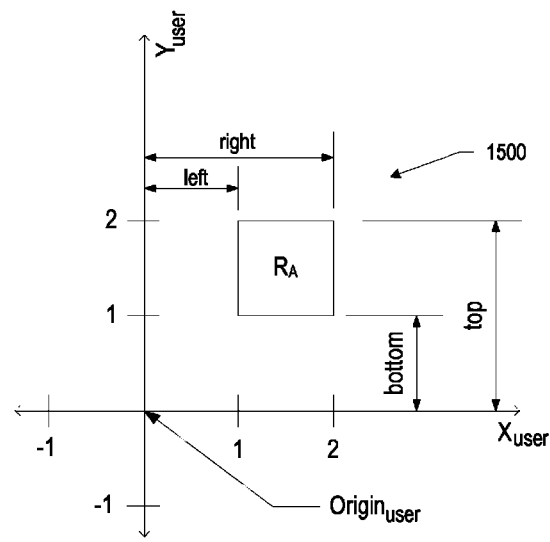
FIG. 15 depicts a rectangle in PDF user space coordinate system identified with diagonal corners (left, bottom) and (right, top).
Figure 16:
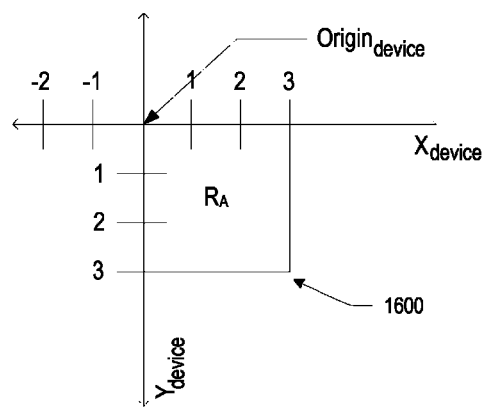
FIG. 16 depicts a rectangle in a device coordinate system where the origin is located at the top-left corner of the rectangle and unit size is three times (×3) user space unit size.

FIG. 14 illustrates the Rendered Image in terms of a two-dimensional grid 1400 of non-overlapping Tiles whose pixel data is individually rendered then serialized as Rendered Image pixel data.

Figure 17:
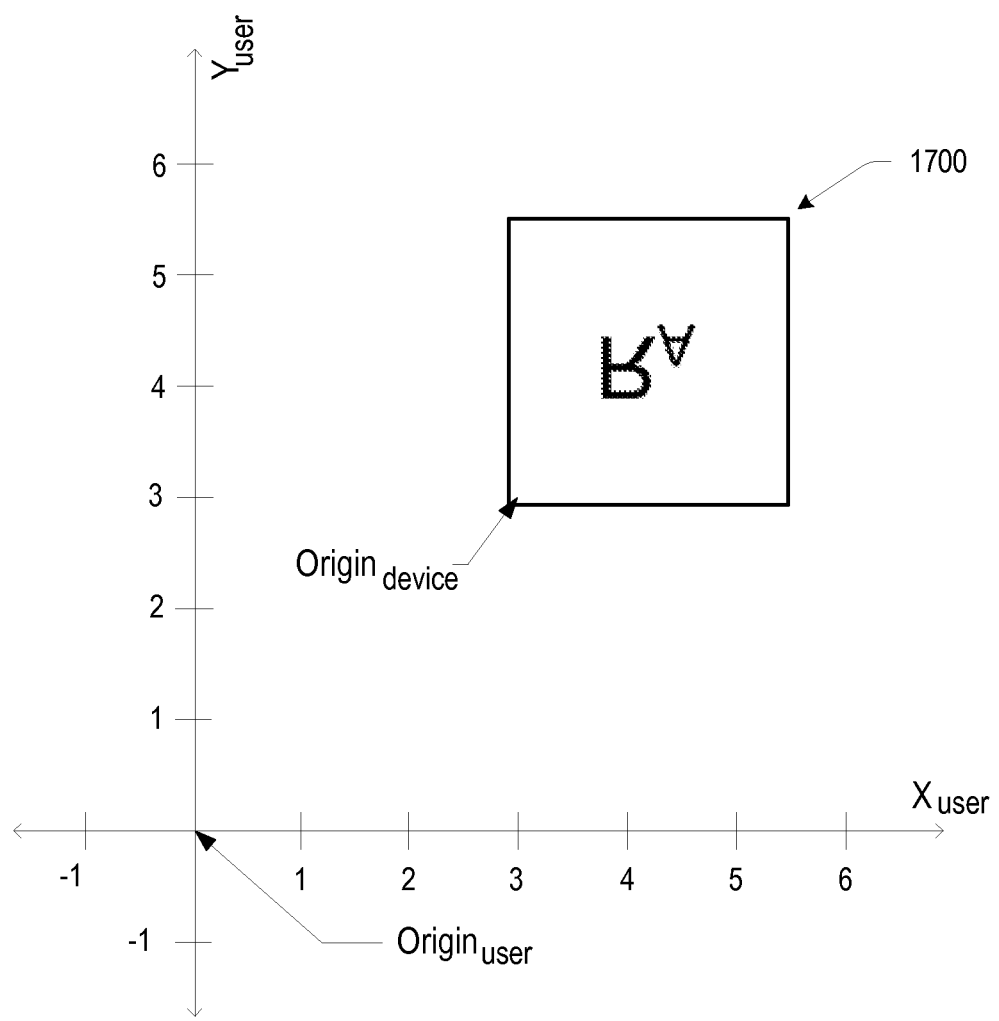
FIG. 17 depicts a rectangle in user space that has been transformed with a 3×3 matrix that flips and scales user coordinates.

FIG. 17 depicts a rectangle 1700 in user space that has been transformed with a 3×3 matrix that flips and scales user coordinates.

Figure 18:
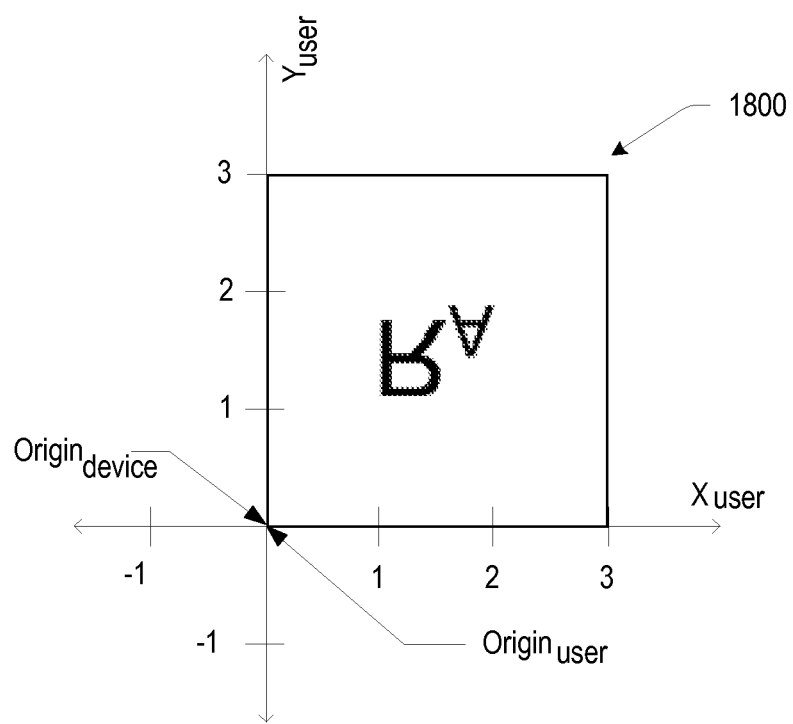
FIG. 18 depicts a rectangle in user space transformed with a 3×3 matrix to the device coordinate system.
Figure 19:
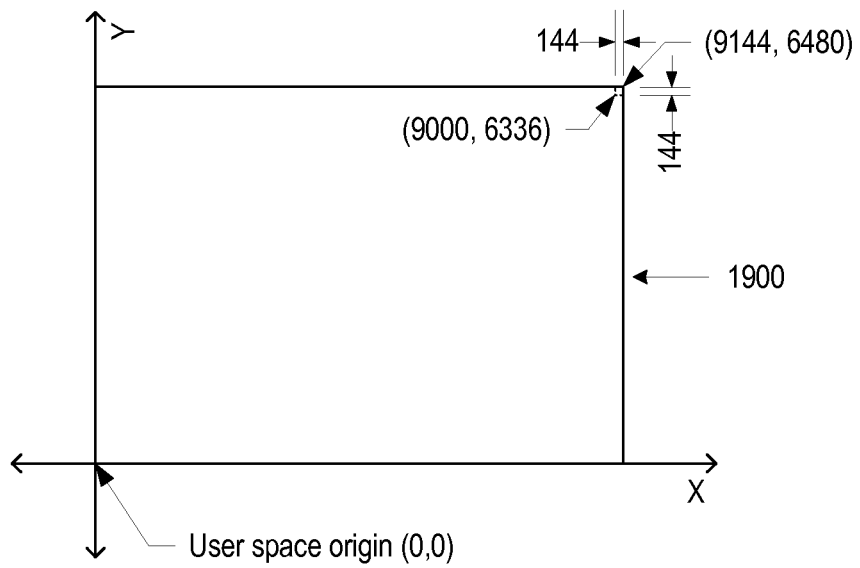
FIG. 19 depicts the Render Area corresponding to a 2"×2" locality at the top-right corner of a 127"×90" PDF page in user space.
Figure 20:
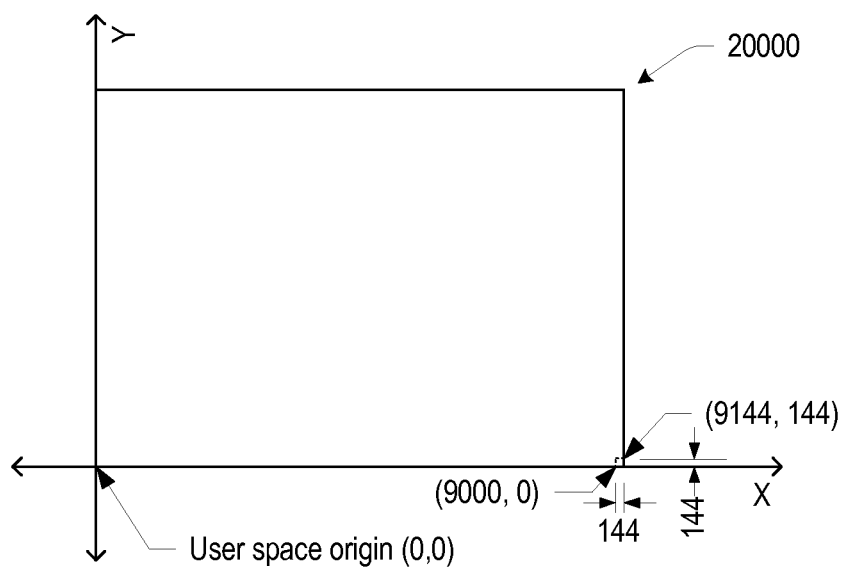
FIG. 20 depicts the Render Area corresponding to a 2"×2" locality at the top-right corner of a 127"×90" PDF page in flipped page space.

FIG. 18 depicts a rectangle 1800 in user space transformed with a 3×3 matrix to the device coordinate system.

Figure 2:
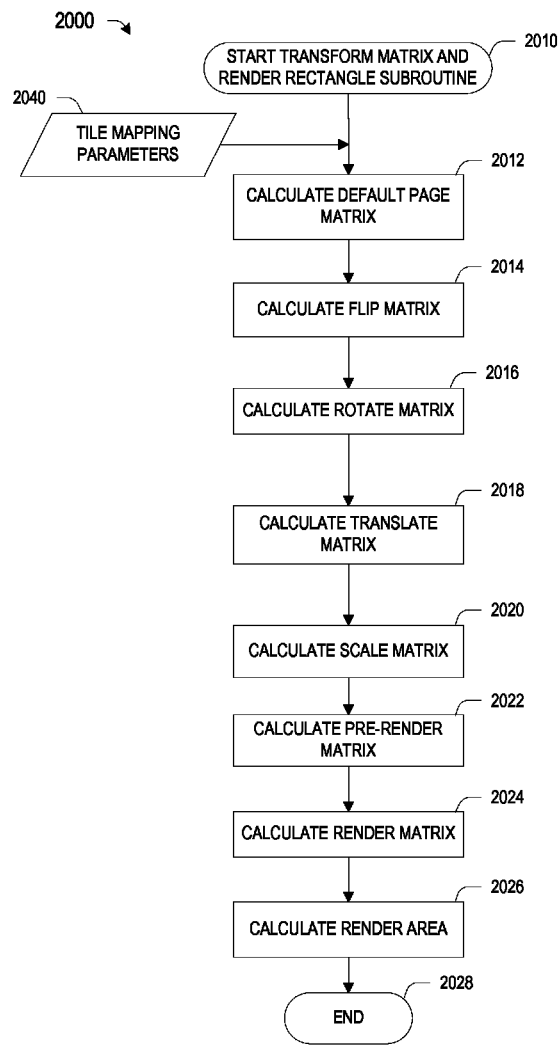
FIG. 2 depicts a method to derive a Pre-Render Matrix, and a Render Matrix and Render Area for PDFL render requests using characteristics of the requested Rendered Image pixel data, in accordance with the present invention.
Figure 24:
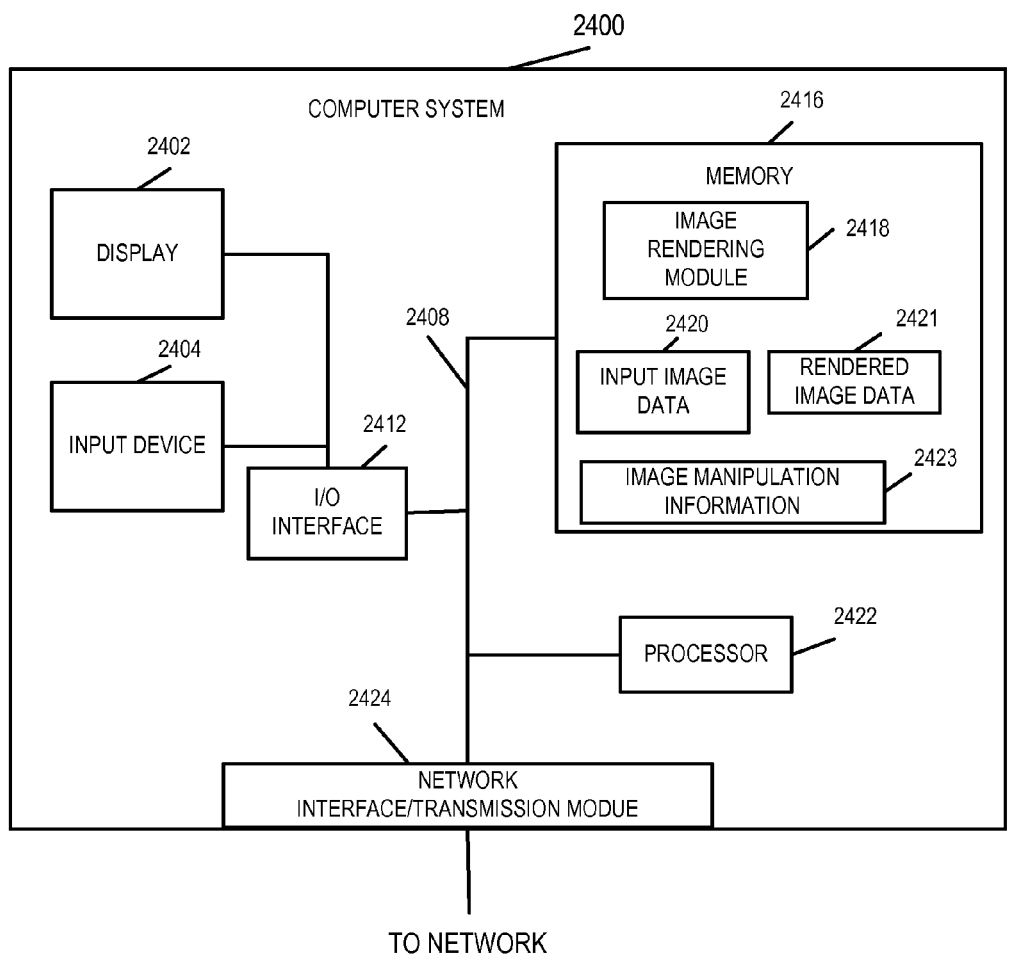
FIG. 24 illustrates an exemplary processing system, e.g., a computer system, implemented in accordance with one embodiment of the invention.
Figure 25:
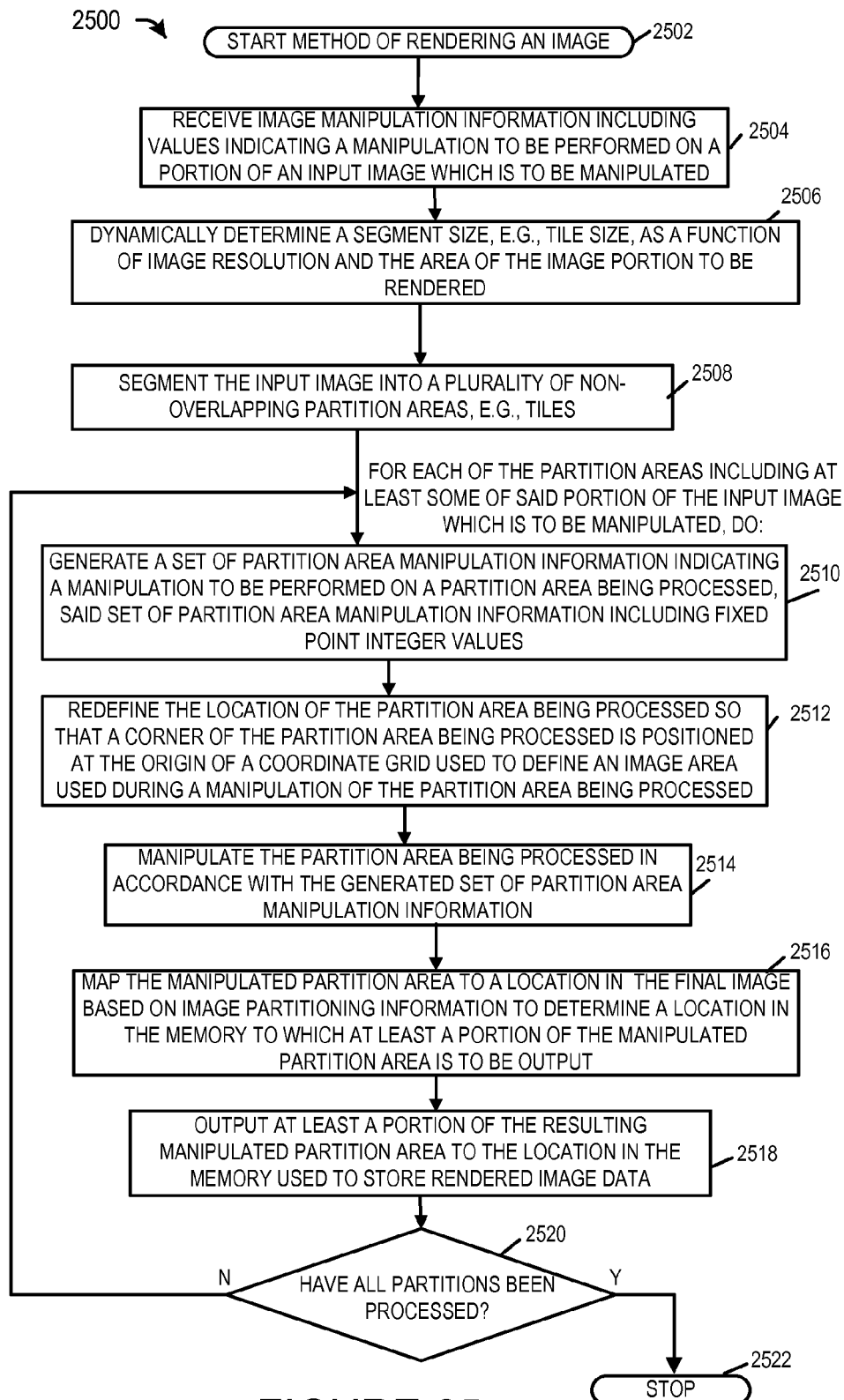
FIG. 25 is a flowchart of an exemplary method of rendering an image, in accordance with an exemplary embodiment of the invention.
Figure 26:
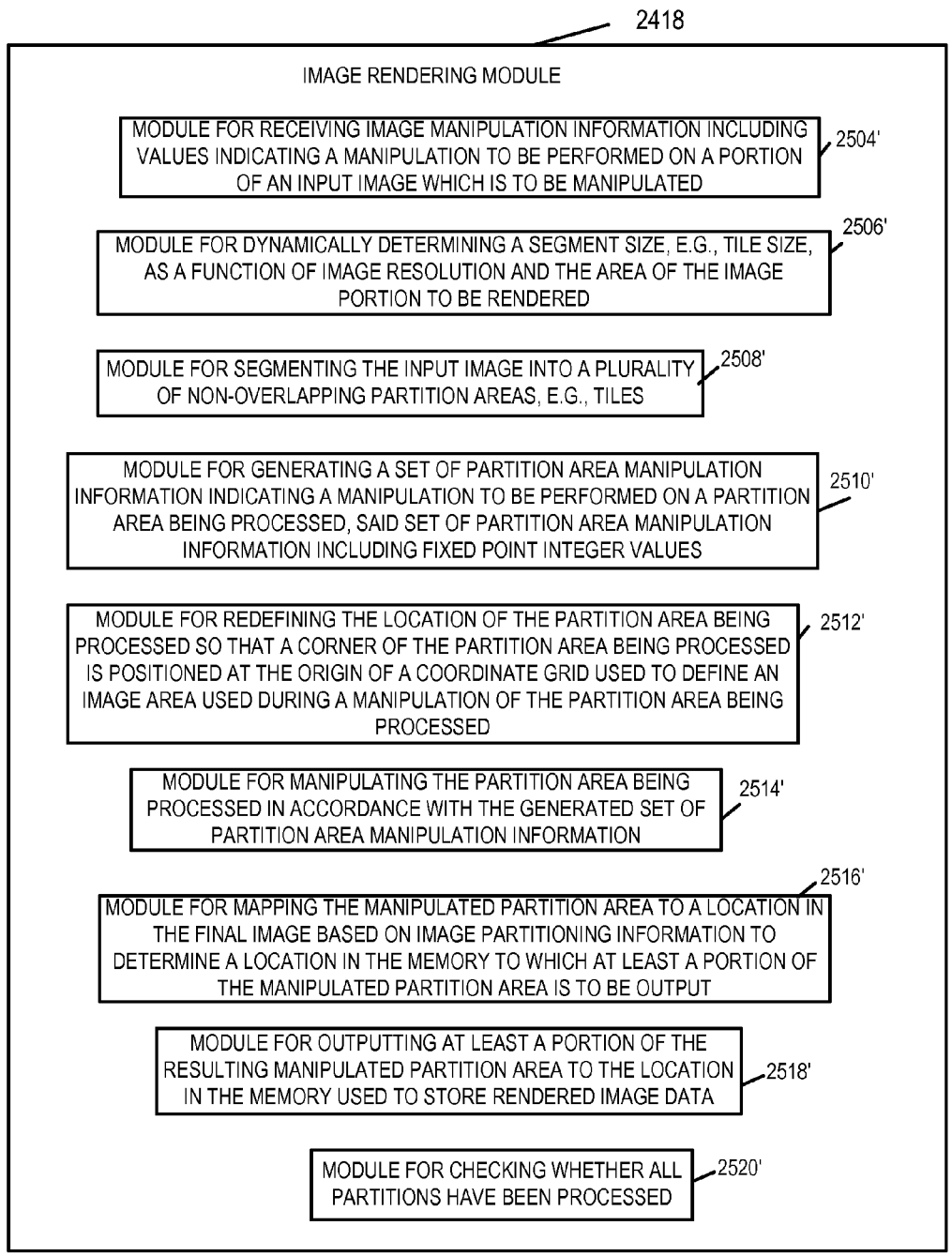
FIG. 26 illustrates an exemplary image rendering module which can be used in a system, e.g., computer system of FIG. 24.

FIG. 24 illustrates a computer system 2400 which may be used to implement and perform the processing steps shown in the flowchart of FIG. 1. The computer system includes a display device 2402 and an input device such as a keyboard 2404 which are both coupled to an I/O interface 2412. The I/O interface 2412 is coupled by a bus 2408 to memory 2416, a processor 2422 and a network interface/transmission module 2424. The memory 2416 includes an image rendering module 2418 which includes instructions for controlling the computer system 2400, when executed by processor 2422, to perform the steps of the flowchart of FIG. 1. The module 2418 may include a plurality of individual modules as shown in FIG. 26 with each of the individual modules performing a function corresponding to a step in the method shown in FIG. 25 when the method of FIG. 25 is used. In embodiments which operate in accordance with the methods shown in FIGS. 1 and 2 image processing module 2418 includes a separate module corresponding to each individual step of the methods shown in FIGS. 1 and 2. In addition to image processing module 2418, memory includes original or unprocessed image data 2420 corresponding to one or more images, e.g., images represented in PDF format or another image format, which may be processed. Rendered image data 2421 is also included in memory. The rendered image data 2421 may be the result of rendering performed in accordance with the present invention. Processed image data 2421 is also included in memory. the rendered image data may be in the form of a bitmap image used to control a display device or in another format such as a device context format, e.g., an image format used to control a printer to generate a printed version of the rendered image. The device context format may be a line drawing image format. The processed, e.g., rendered, image data corresponding to multiple images may be stored in memory 2416 and, in some embodiments is retrieved and displayed or transmitted, e.g., in response to a user request. As can be appreciated, the manipulations performed as part of the rendering operation may be intended to put the requested image area in a format suitable for the display or other output device and thus the specified manipulations to be performed as part of the rendering may be a function of the output device's display or printing capabilities.

FIG. 25 is a flowchart showing the steps of an exemplary image rendering method 2500 implemented in accordance with one exemplary embodiment of the invention. The method shown in FIG. 25 can, and sometimes is, implemented using a system such as computer system 2400.

The exemplary method starts in step 2502 where the computer system is initialized and begins performing the steps of the method. Operation proceeds from start step 2502 to step 2504. In step 2504 image manipulation information including values indicating a manipulation to be performed on a portion of an input image which is to be manipulated, is received. The received values may include floating point values and, in some cases, includes one or more values which can not be represented in 32 bit fixed point integer number format. Image data, e.g., a file providing or defining the original image to be manipulated may also be received in step 2504. The original image may be in, e.g., PDF format. Operation proceeds from step 2504 to step 2506. In step 2506, a segment size, e.g., a tile size, is dynamically determined as a function of image resolution and the area of the image portion to be rendered. The image resolution in some embodiments is expressed in dots per inch. The tile size in some embodiments is selected so that the tile area can be expressed in units of user space using 32 bit fixed point integer values.

Operation proceeds from step 2506 to step 2508 wherein following the dynamic determination of a segment size, the input image is segmented into a plurality of non-overlapping partition areas, e.g., segments which are sometimes referred to as tiles. The segmentation performed in step 2508 is in accordance with the segment size determined in step 2506. By minimizing the number of segments generated, e.g., by maximizing segment size while taking into consideration the constraint of using 32 bit fixed point values during segment processing, the number of segments and thus calls to segment level processing routines can be minimized while still allowing for the entire requested image area to be rendered.

Operation proceeds from step 2508 to step 2510 which is the start of a segment processing loop. It should be appreciated that in at least some embodiments, steps 2510 to 2520 which are discussed below, are performed for each of the partition areas, e.g., segments which include at least a portion of the input image area which is to be manipulated. In step 2510 a set of partition area manipulation information indicating a manipulation to be performed on a partition area being processed is generated, the set of partition area manipulation information includes fixed point integer values. Thus, step 2510 performs the step of determining what segment manipulations are to be performed on the image area being processed to achieve the manipulations/rendering operations requested by the information received in step 2504. While the input manipulation information may be expressed in 32 bit floating point values, the partition area manipulation information generated in step 2510 is expressed using 32 bit fixed point integer values which can be processed by, e.g., an existing library subroutine incapable of directly processing the information received in step 2504 due to the values received in step 2504.

Operation proceeds from step 2510 to step 2512. In step 2512 the location of the partition area being processed is redefined so that a corner of the partition area being processed is positioned at the origin of a coordinate grid. The coordinate grid is used to define an image area location during a manipulation of the partition area being processed. This has the advantage of reducing or minimizing the distance from the origin, and thus the distances from the origin which may need to be expressed during processing. This shifting operation decreases the likelihood of generation, during segment area manipulation and processing, of values too large to be represented using 32 bit fixed integer values.

Operation proceeds from step 2512 to step 2514 wherein the partition area being processed is manipulated in accordance with the generated set of partition area manipulation information, e.g., the information generated in step 2510. The manipulation of the partition areas in step 2512 may be achieved through one or more calls to image processing library functions, e.g., functions which use 32 bit fixed point integer values. Thus, in accordance with the invention library functions which could not be used to directly process images because the original images are too large or otherwise have values which can not be expressed directly using 32 bit fixed point integer values can be used to process portions, e.g., segments such as tiles, of the image generated in accordance with the invention.

Operation proceeds from step 2514 to step 2516. In step 2516 the manipulated partition area is mapped to a location in the final image based on image partitioning information to determine a location in the memory to which at least a portion of the manipulated partition area is to be output. The mapping may be based on the original partition information with the mapping function determining the portion of the final output image to which rendered partition data corresponds.

Following the location mapping, the operation proceeds from step 2516 to step 2518. In step 2518 at least a portion of the resulting manipulated partition area is output to the location in the memory used to store rendered image data. The mapping information produced in step 2516 is used to determine the location in memory to which the generated rendered image data is stored. In some embodiments, the rendered image data is data intended to control a display device to display an image. In such an embodiment the rendered image data may be a bitmap representation of an image. The rendered image may be in the form of raster data. In other embodiments, the rendered image data may be in the form of data used by a device, such a printer, to control the device to produce the rendered image. In such a case the rendered image data may be in the form of drawing commands and/or information used to control the device to produce a viewable or hardcopy version of the manipulated image. Such a format is sometimes referred to as a device context format. On Windows based personal computers, in some embodiments, the rendered image data stored in memory is in Window device context format.

Operation proceeds from step 2518 to 2520 where the system checks whether or not each of the partition areas have been processed. If all partition areas have not been processed the operation proceeds from step 2520 back to step 2510. If it is determined that all the partition areas have been processed, signifying that the requested image area has been fully rendered, operation proceeds to step 2522 wherein the method 2500 stops pending another rendering request in which case operation would start once again from step 2502.

FIG. 26 illustrates one particular exemplary implementation of the image rendering module 2418 shown in FIG. 24. Note that the image rendering module 2418 includes a module, e.g., routine, for performing the functions corresponding to each of the steps illustrated and discussed with regard to the method of FIG. 25. Each module 2504', 2506', 2508', 2510', 2512', 2514', 2516', 2518', 2520' corresponds to a step of FIG. 25. For simplicity a module which may be used to control the system 2400 to implement a corresponding step of FIG. 25 is identified using the same reference number as used in FIG. 25 but with a' after the number. Thus, for example, module 2504' which is a module for perceiving image manipulation information including values indicating a manipulation to be performed on a portion of an input image which is to be manipulated corresponds to, and controls the system 2400, to implement step 2504.

Embodiments of this invention may utilize well-known techniques in the art of computer programming in order to optimize execution on particular processors. Examples of such techniques are the use of look-up tables, the use of binary arithmetic and Boolean operations at the bit-level. Embodiments may also choose other heuristics to specify, to partition and to serialize the Rendered Image using a grid of Tiles. Such implementations are to be considered complementary to the art of this invention.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of rendering an image, the method comprising:
   receiving image manipulation information including floating point values of a first coordinate system, said floating point values indicating a manipulation to be performed on a portion of an input image which is to be manipulated;
   segmenting the input image into a plurality of non-overlapping partition areas to be manipulated using a second coordinate system which uses fixed point values;
   for each of the partition areas including at least some of said portion of an input image which is to be manipulated:
      generating a set of partition area manipulation information indicating a manipulation to be performed on a partition area being processed, said set of partition area manipulation information including fixed point values corresponding to said second coordinate system;
      redefining the location of the partition area being processed so that a corner of the partition area being processed is positioned at the origin of a coordinate grid corresponding to the second coordinate system used to define image area location during said manipulating of the partition area being processed;

manipulating the partition area being processed, after redefining the location of the partition area being processed, in accordance with the generated set of partition area manipulation information including fixed point values corresponding to said second coordinate system; and outputting at least a portion of the resulting manipulated partition area to a location in memory used to store rendered image data.

2. The method of claim 1, wherein the rendered image data is pixel data.

3. The method of claim 1, wherein the rendered image data is image data is expressed in a device context format.

4. The method of claim 3, wherein the device context format is a format used by a printer.

5. The method of claim 1, wherein said floating point values indicating a manipulation to be performed includes at least one value which can not be expressed as a 32 bit fixed point value; and wherein said fixed point values in said set of partition area manipulation information are 32 bit fixed point values.

6. The method of claim 5, wherein said values indicating a manipulation to be performed include 32 bit floating point values.

7. The method of claim 5, wherein dynamically determining a segment size includes selecting as a segment width, when said portion of an input image has a width that is too large to express as a 32 bit fixed point value, which is the largest width that can be expressed as a 32 bit fixed point value.

8. The method of claim 1, further comprising:
prior to segmenting the image, dynamically determining a segment size as a function of image resolution expressed in dots per inch and the area of the image portion to be rendered.

9. The method of claim 1,
wherein said input image is represented in a PDF format; and
wherein manipulating the partition area being processed includes a call to a PDF graphics rendering subroutine.

10. The method of claim 9, further comprising:
mapping the manipulated partition area to a location in the final output image based on image partitioning information to determine the location in the memory to which at least a portion of the manipulated partition area is to be output.

11. An apparatus for rendering an image, comprising: processor configured to:
receive image manipulation information including floating point values of a first coordinate s stem said floating point values indicating a manipulation to be performed on a portion of an input image which is to be manipulated;
segment the input image into a plurality of non-overlapping partition areas to be manipulated using a second coordinate system which uses fixed point values;
generate a set of partition area manipulation information indicating a manipulation to be performed on a partition area being processed, said set of partition area manipulation information including fixed point values corresponding to the second coordinate system;
redefine the location of the partition area being processed, prior to manipulating the partition area being processed, so that a corner of the partition area being processed is positioned at the origin of a coordinate grid corresponding to the second coordinate system used to define image area location during said manipulation of the partition area being processed;
manipulate the partition area being processed in accordance with the generated set of partition area manipulation information including fixed point values corresponding to said second coordinate system; and
an output output at least a portion of the resulting manipulated partition area to a location in memory used to store rendered image data.

12. The apparatus of claim 11, further comprising:
dynamically determine, prior to segmenting the image, a segment size as a function of image resolution expressed in dots per inch and the area of the image portion to be rendered.

13. The apparatus of claim 11, wherein the rendered image data is pixel data.

14. A non-transitory computer readable medium including computer executable instructions for controlling a computer to implement a method of rendering an image, the method comprising:
receiving image manipulation information including floating point values of a first coordinate system, floating point values indicating a manipulation to be performed on a portion of an input image which is to be manipulated;
segmenting the input image into a plurality of non-overlapping partition areas to be manipulated using a second coordinate system which uses fixed point values;
for each of the partition areas including at least some of said portion of an input image which is to be manipulated:
generating a set of partition area manipulation information indicating a manipulation to be performed on the partition area being processed, said set of partition area manipulation information including fixed point values corresponding to said second coordinate system;
redefining the location of the partition area being processed so that a corner of the partition area being processed is positioned at the origin of a coordinate grid corresponding to said second coordinate system used to define image area location during said manipulating of the partition area being processed;
manipulating the partition area being processed, after redefining the location of the partition area, in accordance with the generated set of partition area manipulation information including fixed point values corresponding to said second coordinate system; and
outputting at least a portion of the resulting manipulated partition area to a location in memory used to store rendered image data.

* * * * *